(12) United States Patent
Danguchi

(10) Patent No.: US 12,276,084 B2
(45) Date of Patent: Apr. 15, 2025

(54) METHOD FOR CONTROLLING WORK MACHINE, WORK MACHINE CONTROL PROGRAM, AND WORK MACHINE CONTROL SYSTEM

(71) Applicant: Yanmar Holdings Co., Ltd., Osaka (JP)

(72) Inventor: Masashi Danguchi, Fukuoka (JP)

(73) Assignee: Yanmar Holdings Co., Ltd., Osaka (JP)

( * ) Notice: Subject to any disclaimer, the term of this patent is extended or adjusted under 35 U.S.C. 154(b) by 267 days.

(21) Appl. No.: 17/865,374

(22) Filed: Jul. 14, 2022

(65) Prior Publication Data

US 2023/0030108 A1    Feb. 2, 2023

(30) Foreign Application Priority Data

Jul. 30, 2021    (JP) .................. 2021-125000

(51) Int. Cl.
| | | |
|---|---|---|
| *E02F 9/20* | (2006.01) | |
| *B60Q 9/00* | (2006.01) | |
| *B60R 21/0134* | (2006.01) | |
| *E02F 9/22* | (2006.01) | |
| *E02F 9/24* | (2006.01) | |
| *E02F 9/26* | (2006.01) | |

(52) U.S. Cl.
CPC .............. *E02F 9/2033* (2013.01); *B60Q 9/00* (2013.01); *B60R 21/0134* (2013.01); *E02F 9/24* (2013.01); *E02F 9/26* (2013.01); *E02F 9/261* (2013.01); *E02F 9/2228* (2013.01); *E02F 9/2285* (2013.01); *E02F 9/2292* (2013.01); *E02F 9/2296* (2013.01)

(58) Field of Classification Search
CPC ... E02F 9/2033; E02F 9/24; E02F 9/26; E02F 9/261; E02F 9/2228; E02F 9/2285; E02F 9/2292; E02F 9/2296; E02F 9/262; B60Q 9/00; B60Q 9/008; B60R 21/0134; B60R 1/27; B60R 2300/105; B60R 2300/303; B60R 2300/70; B60R 2300/8093; G06T 7/10; G06V 20/52; G06V 20/56; H04N 7/18

See application file for complete search history.

(56) References Cited

U.S. PATENT DOCUMENTS

2019/0093318 A1*    3/2019    Izumikawa ........... E02F 9/2033

* cited by examiner

*Primary Examiner* — Alan D Hutchinson
(74) *Attorney, Agent, or Firm* — Chris Mizumoto

(57) ABSTRACT

The method for controlling the work machine includes executing a restraint process of restraining an operation of the work machine based on a detection result of a detector detecting a detection target in a monitoring area around the work machine, performing switching between an enabled state and a disabled state of a function associated with the restraint process, and displaying a display screen including restraint state information indicating whether the function associated with the restraint process is enabled or disabled, on a display device.

13 Claims, 12 Drawing Sheets

METHOD FOR CONTROLLING WORK MACHINE, WORK MACHINE CONTROL PROGRAM, AND WORK MACHINE CONTROL SYSTEM

CROSS-REFERENCE

This application claims foreign priority of JP2021-125000 filed Jul. 30, 2021, the disclosure of which is hereby incorporated by reference in its entirety.

TECHNICAL FIELD

The present disclosure relates to a method for controlling a work machine, a work machine control program, and a work machine control system that are employed in a work machine having a function of detecting a detection target in a surrounding monitoring area, and the work machine.

BACKGROUND ART

As a related art, work machines (excavators) having a swivel section (upper swivel body) mounted on a traveling section (lower traveling body) in a swiveling available manner have been used (refer to, for example, Patent Document 1). Such a work machine according to the related art has an object detection function of detecting a predetermined object within a predetermined detection range set around the work machine using a camera attached to the swivel section. When detecting an object (a person, for example), the work machine activates a buzzer installed in a cabin to inform an operator (an operating person) that the object has been detected. In this work machine, an operation state of the object detection function (a detectable state/an undetectable state) is then displayed on a display device.

PRIOR ART DOCUMENT

Patent Document

Patent Document 1: WO2018/008542A1

SUMMARY OF INVENTION

Technical Problem

In the above related art, as long as the object detection function is in a detectable state, the buzzer is activated when an object is detected, which may be bothersome to the operator.

An object of the present disclosure is to provide a method for controlling a work machine, a work machine control program, a work machine control system, and a work machine that are less cumbersome for the operator.

Solution to Problem

According to an aspect of the present disclosure, a method for controlling a work machine includes executing a restraint process of restraining an operation of the work machine based on a detection result of a detector detecting a detection target in a monitoring area around the work machine, performing switching between an enabled state and a disabled state of a function associated with the restraint process, and displaying a display screen including restraint state information indicating whether the function associated with the restraint process is enabled or disabled, on a display device.

According to another aspect of the present disclosure, a work machine control program causes at least one processor to execute the method for controlling the work machine.

According to still another aspect of the present disclosure, a work machine control system includes a restraint processor, a switch processor, and a display processor. The restraint processor executes a restraint process of restraining an operation of the work machine based on a detection result of a detector detecting a detection target in a monitoring area around the work machine. The switch processor performs switching between an enabled state and a disabled state of the restraint processor. The display processor displays a display screen including restraint state information indicating whether the restraint processor is in an enabled state or a disabled state on a display device.

According to a further aspect of the present disclosure, a work machine includes the work machine control system and a machine body on which the display device is mounted.

Advantageous Effects of Invention

According to the present disclosure, a method for controlling a work machine, a work machine control program, a work machine control system, and a work machine that are less cumbersome for the operator may be provided.

DESCRIPTION OF EMBODIMENTS

Embodiments of the present disclosure will be described below with reference to the accompanying drawings. The following embodiments are embodied examples of the present disclosure and are not intended to limit the technical scope of the present disclosure.

First Embodiment

1. Entire Configuration

Figure 1:
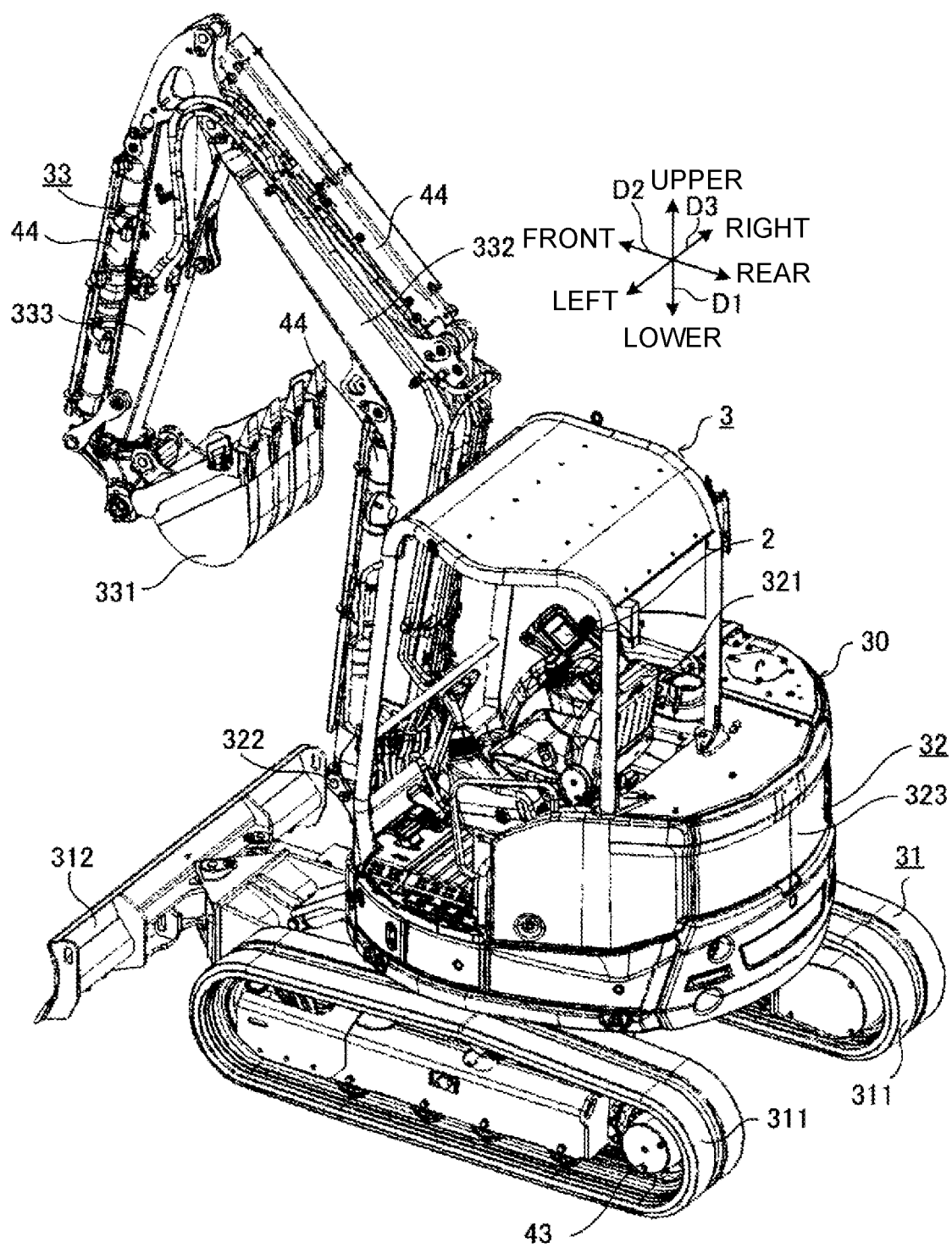
FIG. 1 is a perspective view schematically illustrating an entire configuration of a work machine according to a first embodiment.
Figure 2:
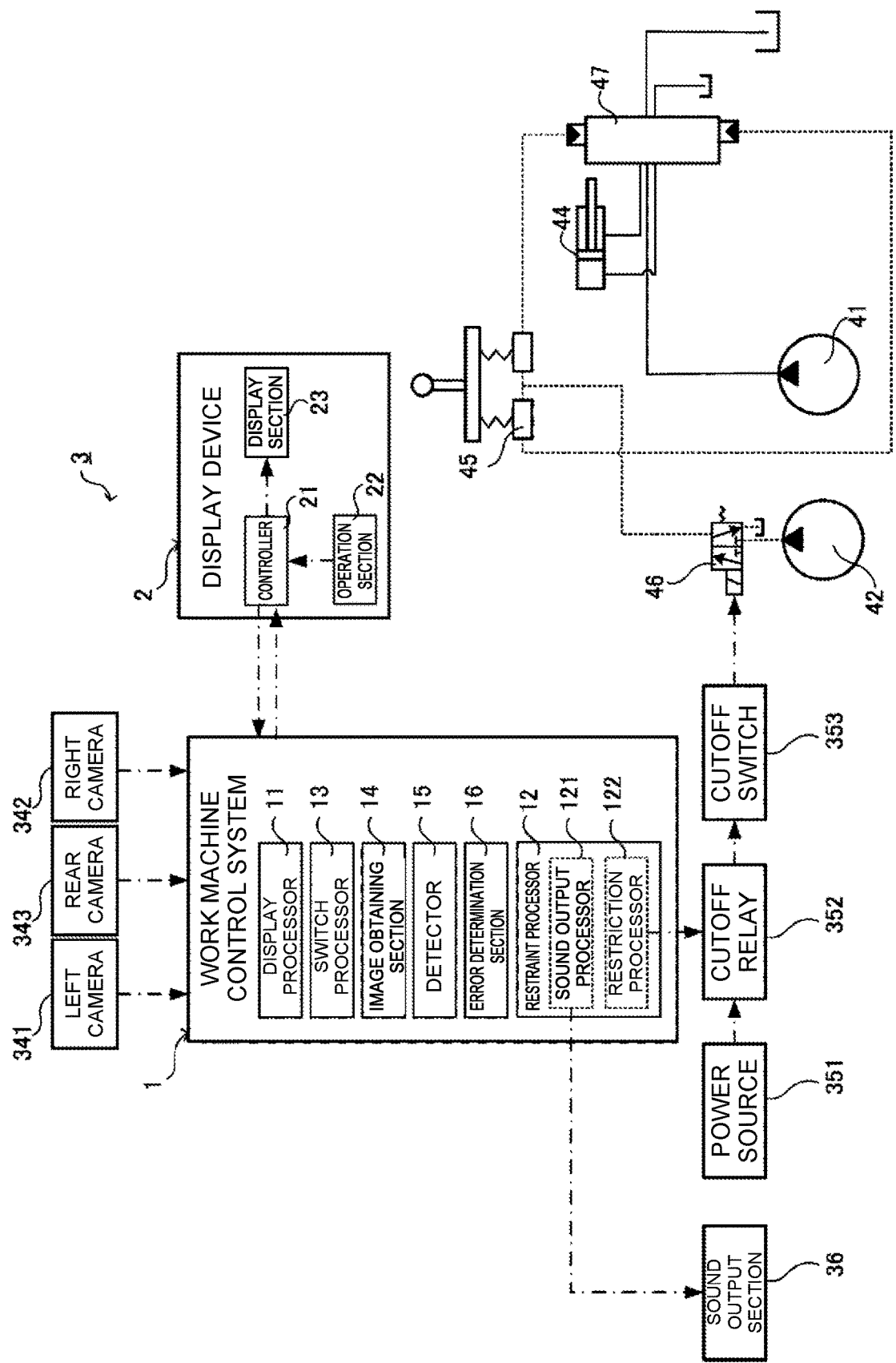
FIG. 2 is a diagram schematically illustrating a hydraulic circuit and the like of the work machine according to the first embodiment.

As shown in FIG. 1, a work machine 3 in this embodiment includes a machine body 30 having a traveling section 31, a swivel section 32, and a work section 33. The work machine 3 further includes a work machine control system 1 (hereinafter simply referred to as a "control system 1") as illustrated in FIG. 2. In addition, the machine body 30 further includes a display device 2 and an operation device.

The "work machine" in the present disclosure refers to a machine for various types of work, and is, as an example, a work vehicle, such as a backhoe (including a hydraulic excavator and a mini excavator), a wheel loader and a carrier. The work machine 3 includes the work section 33 configured to perform at least one task including a lifting task. The work machine 3 is not limited to a "vehicle" but may be, for example, a work vessel or a flying work body, such as a drone or a multicopter. Furthermore, the work machine 3 is not limited to a construction machine (construction equipment), but may also be an agricultural machine (farm machine), such as a rice transplanter, a tractor, or a combine harvester. In this embodiment, unless otherwise specified, a case where the work machine 3 is a backhoe with a lifting function (with a crane function) and can perform excavation work, ground leveling work, trenching work, or loading work as well as lifting work is taken as an example.

Moreover, for convenience of explanation, a vertical direction in a state where the work machine 3 is usable is defined as an upper-lower direction D1 in this embodiment. Furthermore, a front-rear direction D2 and a right-left direction D3 are defined based on a direction viewed from a user (an operator) seated on (a driving section 321 of) the work machine 3 in a non-swiveling state of the swivel section 32. In other words, each direction used in this embodiment is a direction defined with respect to the machine body 30 of the work machine 3, and a direction in which the machine body 30 moves when the work machine 3 moves forward referred to as a "front side" and a direction in which the machine body 30 moves when the work machine 3 moves rearward is referred to as a "rear side". Similarly, a direction in which a front end portion of the machine body 30 moves when the work machine 3 swivel to the right is referred to as a "right side," and a direction in which the front end portion of the machine body 30 moves when the work machine 3 swivel to the left is referred to as a "left side". However, these directions are not intended to restrict a use direction (a direction in use) of the work machine 3.

The work machine 3 includes an engine serving as a power source. In the work machine 3, for example, the engine drives a hydraulic pump 41 (refer to FIG. 2), and hydraulic oil is supplied from the hydraulic pump 41 to hydraulic actuators (including hydraulic motors 43 and hydraulic cylinders 44) of sections in the machine body 30 so that the machine body 30 is driven. The work machine 3 is controlled, for example, by a user (operator) seated in the driving section 321 of the machine body 30 who operates an operation lever and the like of an operation device.

It is assumed in this embodiment that the work machine 3 is a passenger-use backhoe as described above, and therefore, the work section 33 is driven in accordance with an operation performed by the user (the operator) seated in the driving section 321 so as to perform work such as excavation work. The driving section 321, on which the user is seated, is disposed on the swivel section 32.

The traveling section 31 has a traveling function of traveling (including swivel) on the ground. The traveling section 31 includes, for example, a pair of right and left crawlers 311 and a blade 312. The traveling section 31 further includes the hydraulic motors 43 (the hydraulic actuators) for traveling for driving the crawlers 311.

The swivel section 32 is disposed over the traveling section 31 and is configured to swivel about a rotation shaft extending in the vertical direction with respect to the traveling section 31. The swivel section 32 has a hydraulic motor (a hydraulic actuator) and other components for swiveling. The swivel section 32 includes, in addition to the driving section 321, the engine and the hydraulic pump 41. At the front end portion of the swivel section 32, a boom bracket 322 on which the work section 33 is attached is disposed.

The work section 33 is configured to perform operations, including a lifting operation. The work section 33 is supported by the boom bracket 322 of the swivel section 32 and performs operations. The work section 33 includes a bucket 331, a boom 332, and an arm 333. The work section 33 further includes the hydraulic actuators (including the hydraulic cylinders 44 and a hydraulic motor) for driving the sections.

The bucket 331 is a type of attachment (work implement) that is attached to the machine body 30 of the work machine 3, and is constituted by an arbitrary implement selected from among a plurality of types of attachment in accordance with content of an operation. The bucket 331, as an example, is removably mounted on the machine body 30 and is replaced according to content of an operation. In addition to the bucket 331, attachments for the work machine 3 include various implements, such as a breaker, an auger, a crusher, a fork, a fork claw, a steel cutter, an asphalt cutter, a mower, and a ripper, a mulcher, a tilt rotator, and a tamper. The work section 33 executes an operation by driving the bucket 331 with power from the driving device.

The boom 332 is supported by the boom bracket 322 of the swivel section 32 in a rotatable manner. Specifically, the boom 332 is supported at the boom bracket 322 in a rotatable manner about a rotation shaft along the horizontal direction. The boom 332 is shaped to extend upward from a base end supported by the boom bracket 322. The arm 333 is coupled to an end of the boom 332. The arm 333 is supported at the boom 332 in a rotatable manner about a rotation shaft along the horizontal direction. The bucket 331 is attached to an end of the arm 333.

The work section 33 operates under power from the engine as the power source. Specifically, the engine drives the hydraulic pump 41 which supplies hydraulic oil to the hydraulic actuators (including the hydraulic cylinders 44) of the work section 33 so that the sections (the bucket 331, the boom 332, and the arm 333) in the work section 33 are operated.

In this embodiment, in particular, the work section 33 has an articulated structure in which the boom 332 and the arm 333 are individually rotatable. That is, the boom 332 and the arm 333 rotate about the respective rotation shafts extending along the horizontal direction so that the articulated work section 33 including the boom 332 and the arm 333 is capable of performing extending and folding movements as a whole.

Each of the traveling section 31 and the swivel section 32, as well as the work section 33, is powered by the engine as the power source. In other words, hydraulic oil is supplied to the hydraulic motors 43 of the traveling section 31, hydraulic motors of the swivel section 32, and so on from the hydraulic pump 41 so that the swivel section 32 and the traveling section 31 are operated.

The engine functions as a power source that supplies power to the various sections as described above. Here, the engine is disposed on the swivel section 32 with the hydraulic pump 41. As an example, the engine is a diesel engine in this embodiment. The engine is driven by fuel (in this case, light oil) supplied from a fuel tank.

Figure 3:
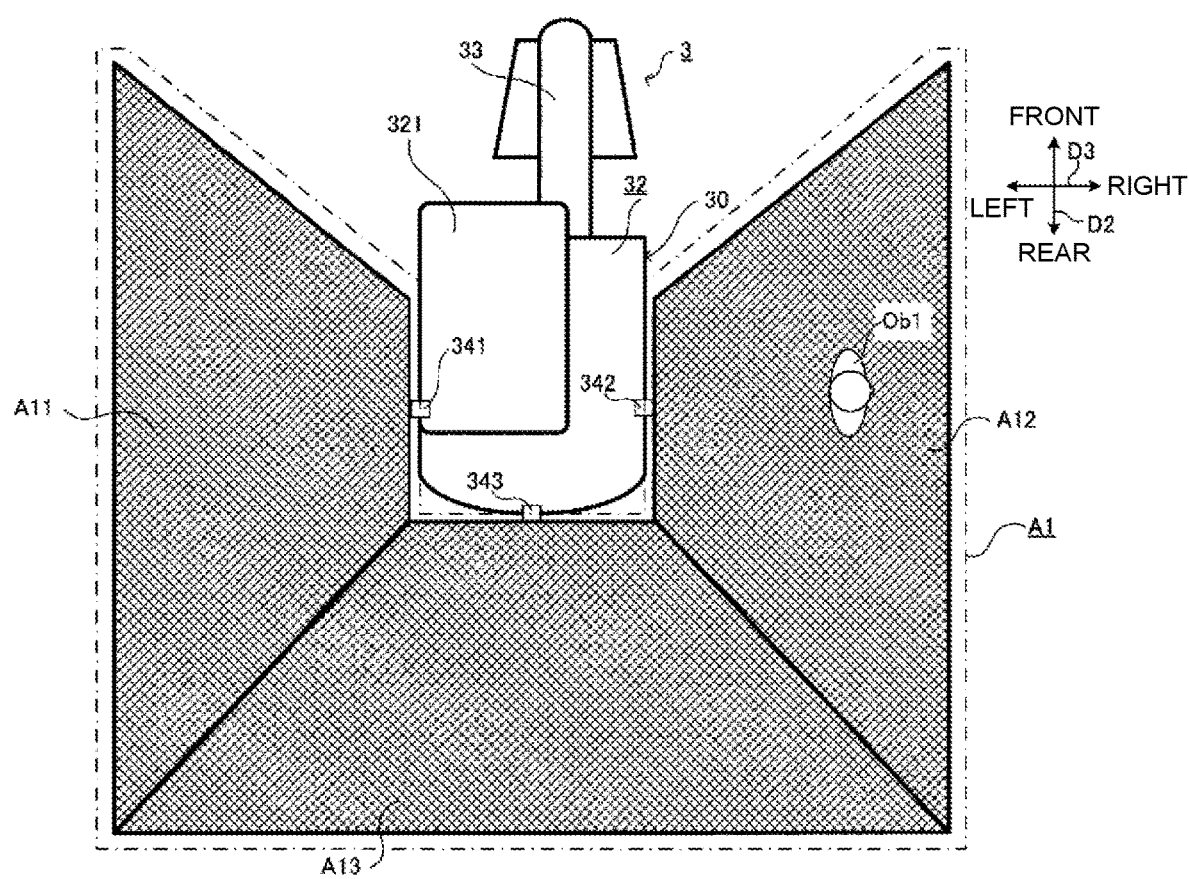
FIG. 3 is a plan view schematically illustrating a monitoring area set around the work machine according to the first embodiment viewed from above the work machine.

The machine body 30 includes various types of sensor (including a camera) that detect a detection target Ob1 (refer to FIG. 3) in a monitoring area A1 (refer to FIG. 3) surrounding the work machine 3, such as a camera that photographs an area surrounding the machine body 30. As an example, as shown in FIG. 3, a plurality of cameras (in this example, three cameras), including a left camera 341, a right camera 342, and a rear camera 343, are mounted on the swivel section 32 of the machine body 30. The left camera 341, the right camera 342, and the rear camera 343 are connected to a control system 1 and output images captured by the cameras to the control system 1. FIG. 3 is a plan view of the work machine 3 viewed from above schematically illustrating the monitoring area A1 set around the work machine 3, the detection target Ob1, and the machine body 30 of the work machine 3 (including the left camera 341, the right camera 342, and the rear camera 343).

The left camera 341, the right camera 342, and the rear camera 343 are installed to face leftward, rightward, and rearward, respectively, with respect to the driving section 321 so as to capture images of a left side, a right side, and a rear side in the monitoring area A1 from the viewpoint of the operator seated in the driving section 321 of the swivel section 32. In other words, as shown in FIG. 3, the monitoring area A1 includes a plurality of (in this case, three) small areas A11, A12, and A13, and the left camera 341 captures images of the small area A11 (left area) which is on a left side as seen from the operator seated in the driving section 321. Similarly, the right camera 342 captures images of the small area A12 (right area) which is on a right side as seen from the operator seated in the driving section 321, and the rear camera 343 captures images of the small area A13 (rear area), which is behind the operator as seen from the operator seated in the driving section 321. This enables the left camera 341, the right camera 342, and the rear camera 343 to cover the both sides (left and right) and the rear side which are often blind spots for the operator.

In FIG. 2, a hydraulic circuit and an electric circuit (electric connections) of the work machine 3 according to this embodiment are schematically illustrated. In FIG. 2, solid lines indicate high-pressure oil paths (for hydraulic oil), dotted lines indicate low-pressure oil paths (for pilot oil), and dashed-dotted lines indicate electric signal paths.

As shown in FIG. 2, the work machine 3 includes, in addition to the hydraulic pump 41, the hydraulic motors 43 (omitted in FIG. 2), and the hydraulic cylinders 44, the pilot pump 42, a remote control valve 45, a control valve 46, and a direction switching valve (control valve) 47.

The hydraulic oil is supplied from the hydraulic pump 41 driven by the engine to the hydraulic motors 43 of the traveling section 31, the hydraulic motor of the swivel section 32, the hydraulic cylinder 44 of the work section 33, and the like. By this, the hydraulic actuators, such as the hydraulic motors 43 and the hydraulic cylinders 44, are driven.

Each of the hydraulic actuators, such as the hydraulic motors 43 and the hydraulic cylinders 44, includes the pilot-type direction switching valve 47 capable of changing a direction and a flow amount of the hydraulic oil supplied from the hydraulic pump 41. The direction switching valve 47 is driven when pilot oil serving as an input instruction is supplied from the pilot pump 42.

Here, the remote control valve 45 is disposed in a supply path of the pilot oil to the direction switching valve 47 corresponding to the hydraulic cylinders 44 of the work section 33. The remote control valve 45 outputs a work operation instruction for the work section 33 in response to an operation of the operation lever. The work operation instruction instructs a expanding operation, a contracting operation, and the like of the work section 33. An electromagnetic control valve 46 (solenoid valve) is inserted between the remote control valve 45 and the pilot pump 42. The control valve 46 is connected through the cutoff relay 352 and the cutoff switch 353 to the power source 351 and operates in accordance with current supplied from the power source 351.

Similarly, remote control valves are also disposed in supply paths of the pilot oil to direction switching valves corresponding to the hydraulic motors 43 of the traveling section 31. Each of the remote control valves outputs a traveling operation instruction for the traveling section 31 in response to an operation of the operation lever. The traveling operation instruction instructs a traveling operation (e.g., forward or backward) of the traveling section 31. Furthermore, a remote control valve is also disposed in a supply path of the pilot oil to a direction switching valve corresponding to the hydraulic motor of the swivel section 32. The remote control valve outputs a swivel operation instruction for the swivel section 32 in response to an operation of the operation lever. The swivel operation instruction instructs a swivel operation (e.g., left swivel or right swivel) of the swivel section 32. The electromagnetic control valve 46 (solenoid valve) is also inserted between these remote control valves and the pilot pump 42. The control valve 46 is connected through the cutoff relay 352 and the cutoff switch 353 to the power source 351 and operates in accordance with current supplied from the power source 351.

The control valve 46 opens the flow path of the pilot oil from the pilot pump 42 to the remote control valve 45 while the control valve 46 is energized, that is, in a state in which current is supplied, and shuts off the flow path of the pilot oil while the control valve 46 is de-energized, that is, in a state in which supply current is blocked. Therefore, the hydraulic actuator corresponding to the remote control valve 45 becomes inoperable when the supply current to the control valve 46 is blocked, and output of the hydraulic actuator is forcibly stopped irrespective of an operation of the operation lever.

Here, the cutoff relay 352 is connected to the control system 1 and is turned on or off in response to a control signal (an electric signal) supplied from the control system 1. The cutoff switch 353 is turned on or off in response to an operation of a cutoff lever, that is, the cutoff switch 353 is turned on when the cutoff lever is operated downward. Therefore, when both the cutoff relay 352 and the cutoff switch 353 are in an ON state, the control valve 46 becomes energized and the flow path of the pilot oil from the pilot pump 42 to the remote control valve 45 is opened so that the hydraulic actuator is driven in response to an operation of the operation lever. On the other hand, when at least one of the cutoff relay 352 and the cutoff switch 353 is in an OFF state, the control valve 46 is de-energized and the flow path of the pilot oil is blocked so that the hydraulic actuator becomes inoperable.

For example, when at least one of the cutoff relay 352 and the cutoff switch 353 that are connected to the control valve 46 inserted between the remote control valve corresponding to the hydraulic motor of the swivel section 32 and the pilot pump 42 is in an OFF state, the hydraulic motor of the swivel section 32 becomes inoperable. In this state, output of the hydraulic actuator (the hydraulic motor of the swivel section 32) is forcibly stopped irrespective of an operation of the operation lever, and therefore, a swivel operation of the swivel section 32 is prohibited.

The control system 1 is mainly configured by a computer system including one or more processors, such as a CPU (Central Processing Unit) and at least one memory, such as a ROM (Read Only Memory) or a RAM (Random Access Memory) and executes various processes (information processing). In this embodiment, the control system 1 is an integrated controller that controls the entire work machine 3 and is configured by, for example, an electronic control unit (ECU). However, the control system 1 may be disposed separately from the integrated controller. The control system 1 will be described in detail in the section "2. Configuration of Control System".

The display device 2 is installed in the driving section 321 of the machine body 30 and is a user interface for receiving operation inputs performed by the user (the operator) and outputting various information to the user. The display device 2 accepts various operations performed by the user, for example, by outputting electric signals in response to user operations. Accordingly, the user (the operator) can view a display screen Dp1 (refer to FIG. 4) displayed on the display device 2 and can operate the display device 2 where appropriate.

As illustrated in FIG. 2, the display device 2 includes a controller 21, an operating unit 22, and a display section 23. The display device 2 can communicate with the control system 1 and can perform transmission and reception of data with the control system 1. As an example, the display device 2 is a dedicated device used in the work machine 3 in this embodiment.

The controller 21 controls the display device 2 in accordance with data supplied from the control system 1. Specifically, the controller 21 outputs an electric signal in response to a user operation received by the operating unit 22, and displays the display screen Dp1 generated by the control system 1 in the display section 23.

Figure 4:
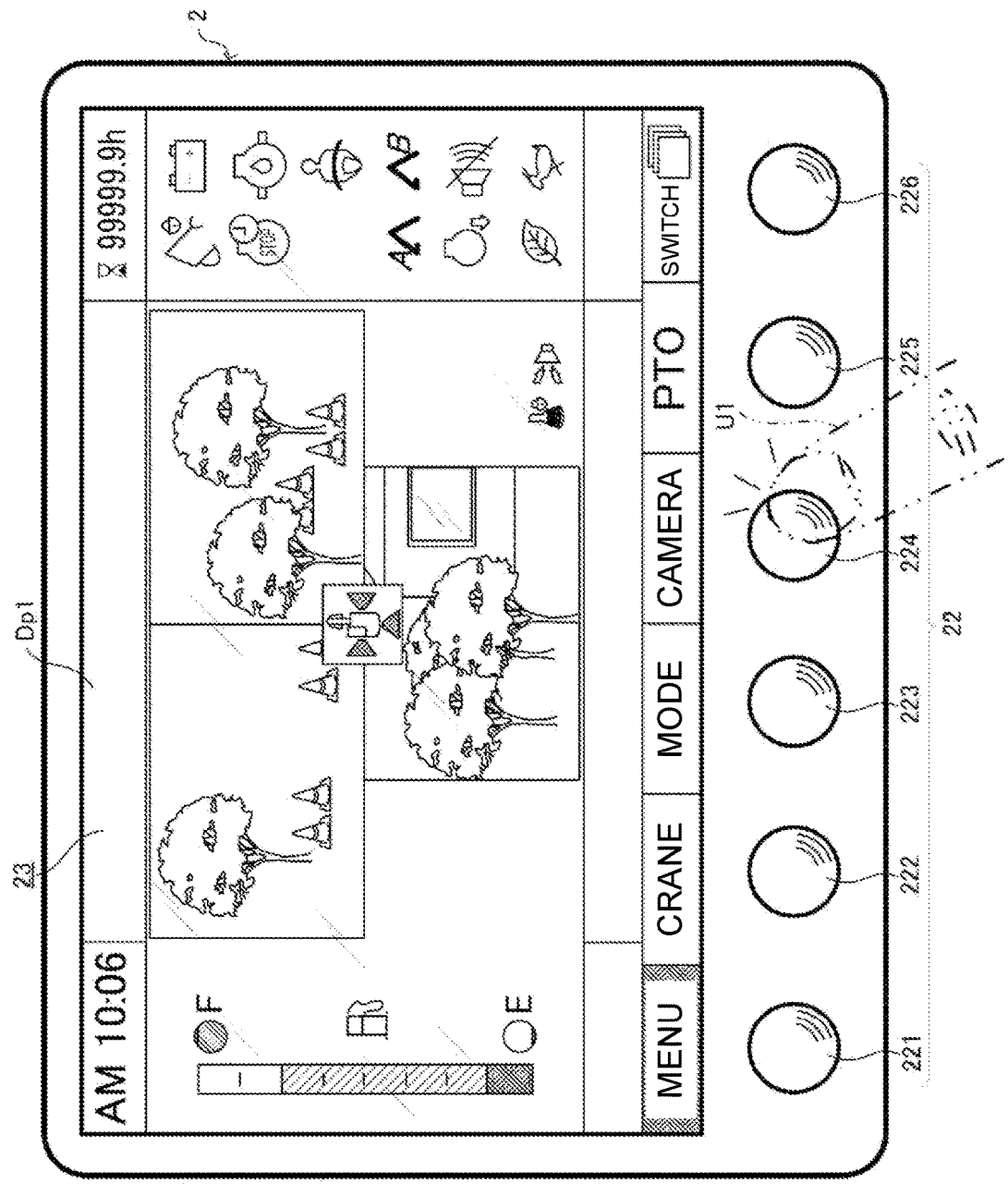
FIG. 4 is an external view schematically illustrating a display device displaying a display screen by a work machine control system according to the first embodiment.

The operating unit 22 is a user interface for accepting a user (operator) operation input to the display screen Dp1 displayed in the display section 23. The operating unit 22 accepts various operations performed by a user U1 (refer to FIG. 4), for example, by outputting electric signals in response to the operations of the user U1. As an example, the operating unit 22 includes a plurality of (six in this embodiment) mechanical push button switches 221 to 226 as illustrated in FIG. 4 in this embodiment. The plurality of push button switches 221 to 226 are disposed in the vicinity of a display region of the display section 23 along a periphery (a lower portion in the example in FIG. 4). The plurality of push button switches 221 to 226 are associated with items displayed on the display screen Dp1 described below, and when one of the plurality of push button switches 221 to 226 is operated, a corresponding one of the items displayed on the display screen Dp1 is operated (selected).

Furthermore, the operating unit 22 may include a touch panel and an operation dial. Also in this case, one of the items displayed on the display screen Dp1 is operated (selected) by an operation performed on the operating unit 22.

The display section 23 is a user interface for displaying information to the user U1 (the operator), such as a liquid crystal display or an organic EL display that displays various types of information. The display section 23 presents various types of information to the user by means of display. As an example, in this embodiment, the display section 23 is a full-color liquid crystal display with a backlight and has a "horizontally-long" display area that is long in a horizontal direction as shown in FIG. 4.

The display device 2 presents various information on the display screen Dp1 to the user U1 (the operator) operating the work machine 3. In other words, the user U1 who operates the work machine 3 can visually obtain various information associated with the work machine 3 by viewing the display screen Dp1 displayed on the display device 2. As an example, the user U1 can recognize, on the display device 2, information on an operation state of the work machine 3 required for an operation of the work machine 3 when the information associated with the operation state of the work machine 3, such as a coolant temperature and a hydraulic oil temperature, is displayed on the display device 2. The display device 2 can also display on the display screen Dp1 images of the areas around the work machine 3 (images of the monitoring area A1) captured by the left camera 341, the right camera 342, and the rear camera 343. Therefore, the user U1 (the operator) may recognize, when operating the work machine 3, situations in the side and rear areas of the work machine 3 which are likely to be blind spots of the driving section 321 on the display screen Dp1 displayed on the display device 2.

Furthermore, the work machine 3 includes a sound output section 36 (refer to FIG. 2) that outputs sound (including voice) to the user U1 (operator). The sound output section 36 includes a buzzer or a speaker and outputs sound upon receiving an electric signal. The sound output section 36 is connected to the control system 1 and outputs sounds, such as beeps or voice, in response to a sound control signal supplied from the control system 1. In this embodiment, the sound output section 36, as well as the display device 2, is disposed in the driving section 321 of the machine body 30. The sound output section 36 may be disposed integrally with the display device 2.

In addition to the above mentioned components, the machine body 30 further includes the operation lever, a cutoff lever, a communication terminal, a fuel tank, and a battery. The machine body 30 further includes sensors to monitor an operating condition of the machine body 30, such as a coolant temperature sensor, a hydraulic oil temperature sensor, a tachometer that measures an engine speed, and an hour meter that measures an operating time. Moreover, the machine body 30 includes other sensors that detect a state, such as a gate lock lever or a starter switch.

2. Configuration of Control System

Next, a configuration of the control system 1 according to this embodiment will be described with reference to FIG. 2. The control system 1 controls the display device 2 to display the display screen Dp1 on the display device 2. In this embodiment, the display device 2 is mounted on the machine body 30 of the work machine 3 as described above. The control system 1 is a component of the work machine 3 and constitutes the work machine 3 with the machine body 30 and so on. In other words, the work section 3 in this embodiment includes at least the control system 1 and the machine body 30 (including the traveling section 31, the swivel section 32, and the working section 33) on which the display device 2 is disposed.

A "screen", such as the display screen Dp1 in the present disclosure, means an image (picture) displayed on the display device 2 and includes figures, graphics, photographs, text, and moving images. That is, the control system 1 can display the display screen Dp1 including a graphic image representing information on the operation state of the work machine 3, such as the coolant temperature and the hydraulic oil temperature, on the display device 2, for example. Here, when the display screen Dp1 includes a moving image or the like, the display screen Dp1 does not include a constant image but includes images that change from moment to moment.

As illustrated in FIG. 2, the control system 1 includes a display processor 11, a restraint processor 12, a switch processor 13, an image obtaining section 14, a detector 15, and an error determination section 16. In this embodiment, as an example, the control system 1 is mainly constituted by a computer system having at least one processor, and the plurality of functional sections (the display processor 11 and so on) are realized when at least one processor executes the work machine control program. The plurality of functional sections included in the control system 1 may be distributed to a plurality of cases or may be included in a single case.

The control system 1 can communicate with devices included in the various sections of the machine body 30. In other words, at least the display device 2, the sound output section 36, the cutoff relay 352, the left camera 341, the right camera 342, and the rear camera 343 are connected to the control system 1. Accordingly, the control system 1 can control the display device 2, the sound output section 36, and the like, controls the cutoff relay 352 to control the control valve 46, and obtain captured images of the left camera 341, the right camera 342, the rear camera 343, and the like. Here, the control system 1 may transmit and receive various types of information (data) directly to and from each device, or indirectly through a repeater or the like.

The image obtaining section 14 regularly or irregularly obtains outputs of the left camera 341, the right camera 342, and the rear camera 343 from the left camera 341, the right camera 342, and the rear camera 343. In other words, the image obtaining section 14 obtains image data of the monitoring area A1 around the work machine 3 (individual small areas A11, A12, and A13). The data obtained by the image obtaining section 14 is stored in a memory, for example.

The detector 15 detects the detection target Ob1 in the monitoring area A1 around the work machine 3. In other words, the detector 15 determines whether the detection target Ob1 is included in the monitoring area A1 (presence/absence) and outputs a result of the determination as to whether the detection target Ob1 is included in the monitoring area A1. In this embodiment, the detection target Ob1 is a "person", for example. In other words, when a "person" enters the monitoring area A1 around the work machine 3 as a result of a movement of the work machine 3 or a movement of the "person" around the work machine 3, the detector 15 detects the "person" as the detection target Ob1. When a plurality of detection targets Ob1 is included in the monitoring area A1, the detector 15 may also detect the number of detection targets Ob1 (the number of persons).

In this embodiment, the detector 15 detects the detection target Ob1 in the monitoring area A1 based on outputs (image data) of the left camera 341, the right camera 342, and the rear camera 343. Specifically, the detector 15 extracts a feature value in an image by performing image processing on the image data obtained by the image obtaining section 14, and determines whether the detection target Ob1 ("person" in this embodiment) is included in the image based on the feature value. Here, when the detection target Ob1 is included in the image, the detector 15 determines one of the images captured by the left camera 341, the right camera 342, and the rear camera 343 that includes the detection target Ob1. In other words, the detector 15 determines whether the detection target Ob1 is included in the small area A11 captured by the left camera 341, the small area A12 captured by the right camera 342, or the small area A13 captured by the rear camera 343 so as to detect the detection target Ob1.

The error determination section 16 determines whether an error associated with the detection performed by the detector 15 has occurred. Specifically, when an error (malfunction or the like) occurs in one of the detector 15, the left camera 341, the right camera 342, the rear camera 343, and a lighting device illuminating the monitoring area A1, the detector 15 may not properly detect the detection target Ob1. Therefore, the error determination section 16 determines a state in which the detector 15 may not properly detect the detection target Ob1 as a state in which an error associated with detection has occurred in the detector 15.

The restraint processor 12 executes a restraint process restraining an operation of the work machine 3 based on a result of the detection performed by the detector 15. In this embodiment, when the detection result of the detector 15 indicates the presence of the detection target Ob1 (a person in this case) in the monitoring area A1, the restraint processor 12 executes the restraint process. The "restraint process" referred to in the present disclosure means a process that acts to restrain in some way the operation of the work machine 3. As an example, the restraint process includes a process of indirectly restraining an operation of the work machine 3 by warning the user U1 (the operator) operating the work machine 3 by means of sound or light (including display). Furthermore, the restraint process includes a process of directly restraining an operation of the work machine 3 by controlling the traveling section 31, the swivel section 32, and the work section 33 of the work machine 3.

In this embodiment, the restraint processor 12 includes a sound output processor 121 and a restriction processor 122.

The sound output processor 121 controls the sound output section 36 to output a notification sound when the detection target Ob1 is included in the monitoring area A1. Specifically, in this embodiment, the restraint process includes a sound output process of outputting a notification sound. The notification sound may be a simple beep or voice, such as a message "Please be careful". Furthermore, the notification sound may be changed depending on a result of notification of the detector 15 (such as a distance from the machine body 30 to the detection target Ob1). Accordingly, since an operation of the work machine 3 may be indirectly restrained by warning the user U1 (the operator) operating the work machine 3 with a notification sound, a high degree of freedom in the operation of the work machine 3 is realized. That is, when the user U1 operates the work machine 3 paying attention to the detection target Ob1, the operation of the work machine 3 can be continued while contact with the detection target Ob1 is avoided.

When the detection target Ob1 is included in the monitoring area A1, the restriction processor 122 controls the cutoff relay 352 so as to turn off the cutoff relay 352. Therefore, the control valve 46 connected to the power source 351 via the cutoff relay 352 is de-energized, and output of the hydraulic actuator corresponding to the control valve 46 is forcibly stopped. Specifically, in this embodiment, the restraint process includes the restriction process of restricting an operation of the work machine 3. The "restriction process" referred to in the present disclosure means a process that acts to restrict in some way the operation of the work machine 3. As an example, the restriction process includes a process of prohibiting (disabling) the traveling operation of the traveling section 31, a process of prohibiting (disabling) the swivel operation of the swivel section 32, and a process of prohibiting (disabling) the operation of the work section 33. Accordingly, the operation of the work machine 3 may be forcibly restricted irrespective of an operation performed by the user U1 (the operator). That is, contact between the machine body 30 and the detection target Ob1 caused by the operation of the work machine 3 can be avoided.

Here, the restriction process performed by the restriction processor 122 includes at least the process of restricting a swivel motion of the swivel section 32. Specifically, the restriction processor 122 is configured to control the cutoff relay 352 connected to the control valve 46 corresponding to the hydraulic motor of the swivel section 32, and turns off the cutoff relay 352 when the detection target Ob1 is included in the monitoring area A1. Accordingly, in the case where the detection target Ob1 is included in the monitoring area A1, driving of the hydraulic motor of the swivel section 32 is disabled, the swivel section 32 comes to an emergency stop when the swivel section 32 is in a swivel operation, and the swivel operation of the swivel section 32 is prohibited when the swivel section 32 is not in a swivel operation. Specifically, in this embodiment, the work machine 3 includes the traveling section 31 and the swivel section 32 which can be swiveled with respect to the traveling section 31. The restriction process at least restricts the swivel operation of the swivel section 32. Accordingly contact between the machine body 30 and the detection target Ob1 caused by swivel of the swivel section 32 can be avoided, when the detection target Ob1 is included in the monitoring area A1 which is a blind spot for the user U1 (the operator).

The switch processor 13 performs switching between an enabled state and a disabled state of the restraint processor 12. Specifically, the switch processor 13 performs switching between an enable state and a disabled state of a function associated with the restraint process. In short, the restraint processor 12 is not always enabled, but can be switched between an enabled state and a disabled state. In a case where the restraint processor 12 is enabled, the restraint processor 12 executes the restraint process when the detection target Ob1 is included in the monitoring area A1. On the other hand, in a case where the restraint processor 12 is disabled, the restraint processor 12 does not execute the restraint process even when the detection target Ob1 is included in the monitoring area A1.

As an example in this embodiment, the switching between an enabled state and a disabled state of the function (restraint processor 12) associated with the restraint process is performed by the user U1 (the operator) operating the display device 2. In other words, when the user U1 operates the operating unit 22 of the display device 2 to enable the function associated with the restraint process, the switch processor 13 enables the function associated with the restraint process in response to the operation. On the other hand, when the user U1 operates the operating unit 22 of the display device 2 to disable the function associated with the restraint process, the switch processor 13 disables the function associated with the restraint process in response to the operation.

Furthermore, in this embodiment, the restraint process performed by the restraint processor 12 includes the sound output process performed by the sound output processor 121 and the restriction process performed by the restriction processor 122. Thus, the restraint process includes the plurality of specific processes (the sound output process and the restriction process) to restrain the operation of the work machine 3. Here, the restraint process can be individually switched between an enabled state and a disabled state for each specific process. Specifically, the switch processor 13 can perform switching between an enabled state and a disabled state of the sound output processor 121 and the restriction processor 122 in the restraint processor 12. As an example, it is possible to enable the sound output processor 121 and disable the restriction processor 122, or to disable sound output processor 121 and enable the restriction processor 122. Accordingly, only a required number of the specific processes can be enabled depending on a situation, and flexibility of the restraint process is increased.

The display processor 11 has at least a function of displaying the display screen Dp1 on the display device 2. Specifically, the display processor 11 generates the display screen Dp1 based on data and the like obtained by the image obtaining section 14, and controls the display device 2 so as to display the display screen Dp1 in the display section 23 of the display device 2. Furthermore, the display processor 11 operates in response to an operation accepted by the operating unit 22 of the display device 2. The display processor 11 displays, for example, images Im11, Im12, and Im13 (refer to FIG. 5) captured by the left camera 341, the right camera 342 and the rear camera 343, respectively, on the display screen Dp1. Specifically, the display processor 11 displays images of the monitoring area A1 around the work machine 3 (individual small areas A11, A12, and A13) on the display device 2.

Here, the display processor 11 is capable of displaying the display screen Dp1 including the restraint state information I1 (refer to FIG. 5), indicating whether the function associated with the restraint process is enabled or disabled on the display device 2. In other words, although the switch processor 13 performs switching between an enabled state and a disabled state of the function associated with the restraint process, a current state (an enabled/disabled state) of the function associated with the restraint process is displayed as restraint state information I1 on the display screen Dp1. In this way, the display processor 11 displays the display screen Dp1 on the display device 2. The display screen Dp1 includes the restraint state information I1 indicating whether the restraint processor 12 is enabled or disabled. By this, the user U1 (the operator) can visually recognize whether the function associated with the restraint process is enabled or disabled, and can operate the work machine 3 while recognizing that the function associated with the restraint process is enabled or disabled.

Here, the detector 15 is not an essential component of the control system 1. For example, the control system 1 may be configured such that a result of detection performed by an external detector is obtained and the restraint processor 12 performs the restraint process based on the detection result.

3. Method for Controlling Work Machine

Hereinafter, an example of a method for controlling the work machine 3 (hereinafter simply referred to as a "control method") mainly executed by the control system 1 will be described with reference to FIGS. 5 to 9.

The control method according to this embodiment is executed by the control system 1, which is mainly constituted by a computer system, and in other words, the control method is embodied in a work machine control program (hereinafter simply referred to as a "control program"). That is, the control program is a computer program for causing one or more processors to perform individual processes associated with the control method. Such a control program may be cooperatively executed by, for example, the control system 1 and the display device 2.

Here, the control system 1 executes the following various types of process associated with the control method when a specific start operation, which is set in advance to execute the control program, is performed. Examples of the start operation include an operation of starting the engine of the work machine 3. Meanwhile, the control system 1 terminates the various types of process associated with the control method when a specific termination operation, which is set in advance, is performed. Examples of the termination operation include an operation of stopping the engine of the work machine 3.

3.1 Display Screen

First, a configuration of the display screen Dp1 displayed on the display section 23 of the display device 2 by the control method according to this embodiment will be described. In the drawings illustrating the display screen Dp1 displayed on the display section 23 of the display device 2, such as FIG. 5, dashed-dotted lines, leading lines, and reference numerals representing regions are merely for illustrative purposes and are not actually displayed on the display device 2.

Figure 5:
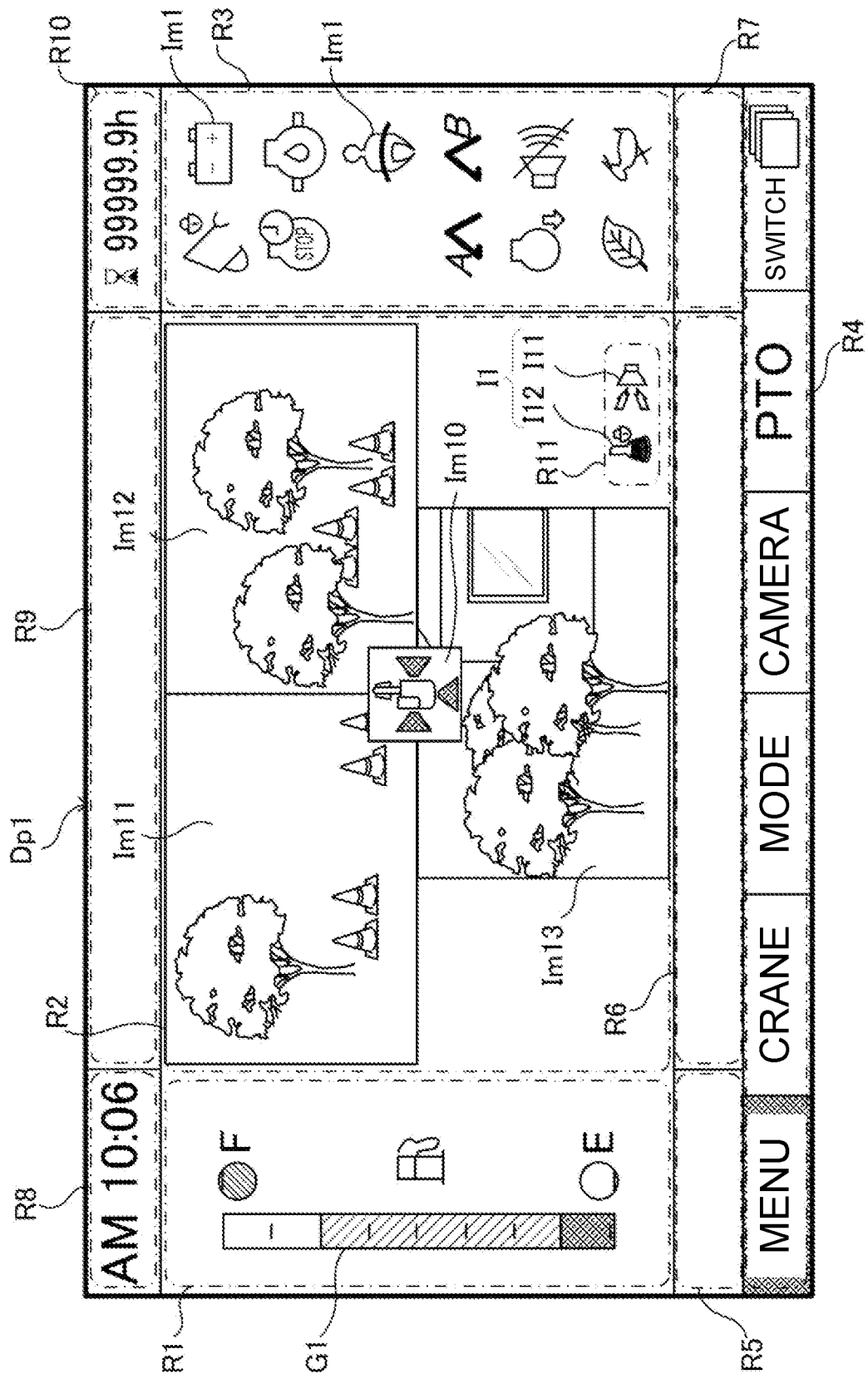
FIG. 5 is a diagram illustrating an example of the display screen displayed by the work machine control system according to the first embodiment.

The display screen Dp1 illustrated in FIG. 5 is a home screen displayed first by the control method. The basic display screen Dp1 is displayed as a home screen that is first displayed on the display device 2 when the work machine 3 is in operation. The display screen Dp1 can transition from the home screen to various display screens Dp1 including a menu screen, a crane screen, a mode screen, and a PTO screen in accordance with an operation performed on the operating unit 22.

As illustrated in FIG. 5, the display screen Dp1 includes a first region R1, a second region R2, a third region R3, a fourth region R4, a fifth region R5, a sixth region R6, a seventh region R7, an eighth region R8, a ninth region R9, and a tenth region R10. In the control method according to this embodiment, as an example, the captured images Im11, Im12, and Im13 (the individual small areas A11, A12, and A13) od the monitoring area A1, the restraint state information I1, and the like are displayed in the second region R2 which occupies the majority of the display screen Dp1. A region in the second region R2 where the restraint state information I1 is displayed is determined as an 11th region R11.

Specifically, the display screen Dp1 is divided vertically (an upper-lower direction) into four regions. The top three regions are further divided into three regions in the horizontal direction (a left-right direction). Accordingly, the display screen Dp1 is divided into ten regions in total. Then, a second row from the top includes, from left to right, the first region R1, the second region R2, and the third region R3. A lowest row includes the fourth region R4. A third row from the top includes, from left to right, the fifth region R5, the sixth region R6, and the seventh region R7, and an uppermost row includes, from left to right the eighth region R8, the ninth region R9, and the tenth region R10. Among the four regions vertically divided, a vertical size of the second row from the top (the first region R1, the second region R2, and third region R3) is the largest. Among the three regions divided horizontally, a horizontal size of a middle region (the second region R2, the sixth region R6, and the ninth region R9) is the largest.

However, the arrangement and sizes of the individual regions are merely examples and may be changed as needed. The individual regions are not required to be clearly divided by boundary lines. For example, even in the example in FIG. 5, although the second and third regions R2 and R3 are clearly divided by a boundary line, there is no boundary line between the first and second regions R1 and R2. Obviously, the first region R1 and the second region R2 may be clearly divided by a boundary line.

The first region R1 is a rectangular region extending in the vertical direction. In the first region R1, for example, remaining amount information G1 regarding an amount of fuel (e.g., diesel oil) remaining in the engine is displayed. Based on an output of a remaining amount sensor (a sensor signal) or the like, the display processor 11 generates remaining amount information G1 in the display screen Dp1.

The second region R2 is a rectangular region extending in the horizontal direction. The captured images Im11, Im12, and Im13 of the monitoring area A1, the restraint state information I1, and the like are displayed in the second region R2. The captured image Im11 corresponds to the small area A11 on the left side of the driving section 321 captured by the left camera 341, and the captured image Im12 corresponds to the small area A12 on the right side of the driving section 321 captured by the right camera 342. The captured image Im13 is an image of the small area A13 behind the driving section 321 captured by the rear camera 343. The display processor 11 displays the captured images Im11, Im12, and Im13 obtained by the image obtaining section 14 in real time. In this embodiment, the captured images Im11, Im12, and Im13 are displayed on an upper left portion of the second region R2, an upper right portion of the second region R2, and a lower center portion of the second region R2, respectively so as to correspond to the relationship of positions when the machine body 30 is viewed from above. Furthermore, in the center portion of the second region R2, an icon Im10 imitating the machine body 30 in accordance with the information is displayed. The icon Im10 schematically illustrating the positional relationship among the imaging ranges of the left camera 341, the right camera 342, and the rear camera 343 (small areas A11, A12, and A13) as seen from the machine body 30.

The restraint state information I1 is displayed in the 11th region R11 set in a lower right portion of the second region R2. As described above, the restraint state information I1 indicates whether the function associated with the restraint process is enabled or disabled, that is, a state (an enabled/disabled state) of the function associated with the restraint process selected by the switch processor 13. In this embodiment, the restraint state information I1 includes graphical images (icons). The restraint state information I1 indicates a state (an enabled/disabled state) of the function associated with the restraint process, for example, by a display mode, such as a display color or a size of the graphic image. The display processor 11 determines the state (an enabled/disabled state) of the function associated with the restraint process based on the operation state of the switch processor 13. Then, the display processor 11 determines a display mode of the graphic image in the restraint state information I1 in accordance with the state (an enabled/disabled state) of the function associated with the restraint process.

Here, the restraint process includes the plurality of specific processes (the sound output process, the restriction process, etc.), each of which can be switched between an enabled state and a disabled state, and the restraint state information I1 is displayed for each specific process. In the example in FIG. 5, the restraint state information I1 includes first restraint state information I11 and second restraint state information I12 which individually correspond to specific processes. The first restraint state information I11 represents an enabled state or a disabled state of the function associated with the sound output process, and the second restraint state information I12 represents an enabled state or a disabled state of the function associated with the restriction process. Each of the first restraint state information I11 and the second restraint state information I12 indicates the sound output process or the restriction process depending on design (picture) of the graphic image.

The third region R3 is a rectangular region extending in the vertical direction. Graphic images (icons) Im1 corresponding to operation states of respective components of the work machine 3 are displayed in the third region R3. In the third region R3, the plurality of images Im1 may be displayed, and designs (pictures) of the individual images Im1 indicate states of a battery, a seat belt, a coolant temperature, a hydraulic oil temperature, and the like. Here, each of the graphic images Im1 indicates an operation state by, for example, a display mode, such as a display color or a size. The display processor 11 determines states of the sections in the work machine 3 using outputs of the various sensors (including the coolant temperature sensor 34 and the hydraulic oil temperature sensor 35) that detect operation states of the sections of the work machine 3. When an abnormal value is detected in any one of the sections, the display processor 11 performs warning display by changing a display mode, such as a display color, of the graphic image Im1 of the section.

The fourth region R4 is a band-shaped region that extends across an entire width of the display screen Dp1. The fourth region R4 displays items for operation on the display screen Dp1. In FIG. 5, six items "Menu," "Crane," "Mode," "Camera," "PTO", and "Switch" are arranged in this order from left to right in the fourth region R4 as an example. The six push button switches 221 to 226 of the operating unit 22 located beneath the six items are associated with the six items, respectively. For example, the item "Menu" is associated with the push button switch 221, and the item "Crane" is associated with a push button switch 222. Therefore, when the push button switch 224 corresponding to the item "Camera" is operated by the user U1 (refer to FIG. 4), the item "Camera" is operated (selected).

Furthermore, in this embodiment, one of the items is highlighted in the fourth region R4 so as to correspond to an operation of an operation dial (or a cursor key) of the operating unit 22. The item "Menu" is highlighted in the example of FIG. 5, and the highlighted item is switched by operating the operation dial (or the cursor key). The user U1 can select a desired item by operating a determination button with a desired item highlighted. Therefore, when the determination button is operated in a state in which the item "Camera" is highlighted, for example, the item "Camera" is operated (selected). Furthermore, when the operating unit 22 includes a touch panel, the user U1 can select a desired item by touching the desired item on the display screen Dp1.

In the fifth region R5, a warning display image (an icon) is displayed to indicate that abnormal values are detected by the various sensors (including the coolant temperature sensor and the hydraulic oil temperature sensor). In the sixth region R6, for example, information on the work section 33 in operation in the work machine 3 is displayed. In the seventh region R7, for example, information on an operation state of the work machine 3, such as an engine speed, is displayed. In the eighth region R8, for example, a current time is displayed. In the ninth region R9, for example, information indicating an item to which the currently displayed display screen Dp1 belongs is displayed. In the tenth region R10, for example, information on an operating time (hour meter) of the work machine 3 is displayed.

3.2 Details

Next, the control method according to this embodiment will be described in detail.

In this embodiment, as described above, switching between enabling and disabling of the function (the restraint processor 12) associated with the restraint process is performed in response to an operation performed by the user U1 as described above. Therefore, the restraint processor 12 is not always enabled, and the user U1 can arbitrarily enable or disable the restraint processor 12.

Furthermore, the enabled/disabled state of the restraint processor 12 is displayed as the restraint state information I1 in the display screen Dp1. In other words, the restraint state information I1 displayed in the 11th region R11 of the display screen Dp1 represents a state (an enabled/disabled state) of the function associated with the restraint process currently selected by the switch processor 13. Therefore, the user U1 can recognize the enabled/disabled state of the function associated with the restraint process by using the restraint state information I1 in the display screen Dp1.

This configuration is advantageous in that the operator (the user U1) is less bothered, for example, when compared with a configuration in which a buzzer is activated when an object is detected as long as the object detection function is in a detectable state. That is, according to the control method of this embodiment, since the enabled state and the disabled state of the function associated with the restraint process (the restraint processor 12) are switchable from one to another, the function is disabled under a situation in which the restraint process (the sound output process and the restriction process) is not required so that the operator (the user U1) is less bothered. On top of that, the enabled/disabled state of the function associated with the restraint function is displayed on the display screen Dp1 as the restraint state information IL and therefore, the operator (the user U1) can easily recognize a current enabled/disabled state of the function associated with the restraint function. Therefore, for example, it is easy to avoid a situation in which the operator (the user U1) operates the work machine 3 mistakenly believing that the function associated with the restraint function is enabled even though the function associated with the restraint function is disabled.

Figure 6:
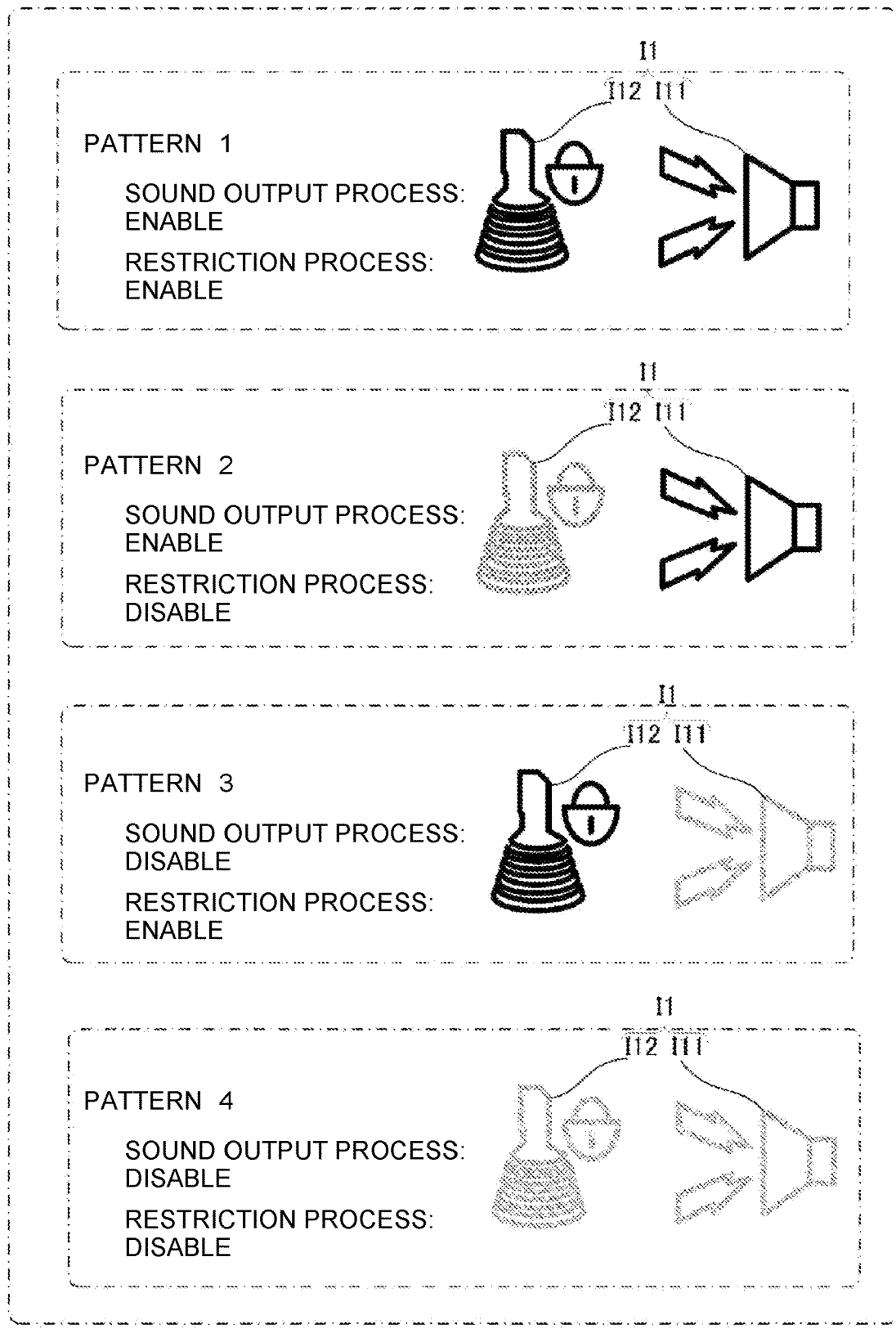
FIG. 6 is a diagram illustrating examples of display modes of restraint state information in the display screen displayed by the work machine control system according to the first embodiment.

FIG. 6 is a diagram illustrating examples of display modes of the restraint state information I1. In this embodiment, since the restraint state information I1 includes the first restraint state information I11 and the second restraint state information I12, the display mode is switched between an enabled state and a disabled state individually for the first restraint state information I11 and the second restraint state information I12. As a result, the following four patterns are generated as display modes of the restraint state information I1: "Pattern 1" in which both the sound output process and the restriction process are enabled, "Pattern 2" in which only the sound output process is enabled, "Pattern 3" in which only the restriction process is enabled, and "Pattern 4" in which both the sound output process and the restriction process are disabled.

As an example, in this embodiment, when the function associated with the restraint process is enabled, the restraint state information I1 is displayed as an active state, and when the function associated with the restraint process is disabled, the restraint state information I1 is displayed as an inactive state. In other words, the restraint state information I1 that is displayed as an active state indicates that the function associated with the restraint process is enabled, and the restraint state information I1 that is displayed as an inactive state indicates that the function associated with the restraint process is disabled. The active restraint state information I1 is displayed in a high-contrast display color, such as green, whereas the inactive restraint state information I1 is displayed in a low-contrast display color, such as gray, for example. Therefore, when the sound output processor 121 is enabled and the restriction processor 122 is disabled in the restraint processor 12, for example, as in "Pattern 2" shown in FIG. 6, the first restraint state information I11 is displayed in green or the like as an active state and the second restraint state information I12 is grayed out as an inactive state.

Thus, according to this embodiment, the restraint state information I1 indicates an enabled state or a disabled state of the restraint state information I1 for each specific process. Therefore, when the restraint process includes the plurality of specific processes (such as the sound output process and the restriction process) for restrain the operation of the work machine 3, the operator (the user U1) can recognize the enabled state or the disabled state of each of the plurality of specific processes.

Furthermore, when the function associated with the restraint process is disabled, the restraint state information I1 is displayed so as to indicate that the function associated with the restraint process is disabled. Specifically, as described above, when the function associated with the restraint process is disabled, the restraint state information I1 indicates that the function associated with the restraint process is disabled by being displayed inactive. Thus, the restraint state information I1 is displayed regardless of whether the function associated with the restraint process is enabled or disabled, and therefore, the operator (the user U1) can easily recognize whether the function associated with the restraint process is enabled or disabled.

Figure 7:
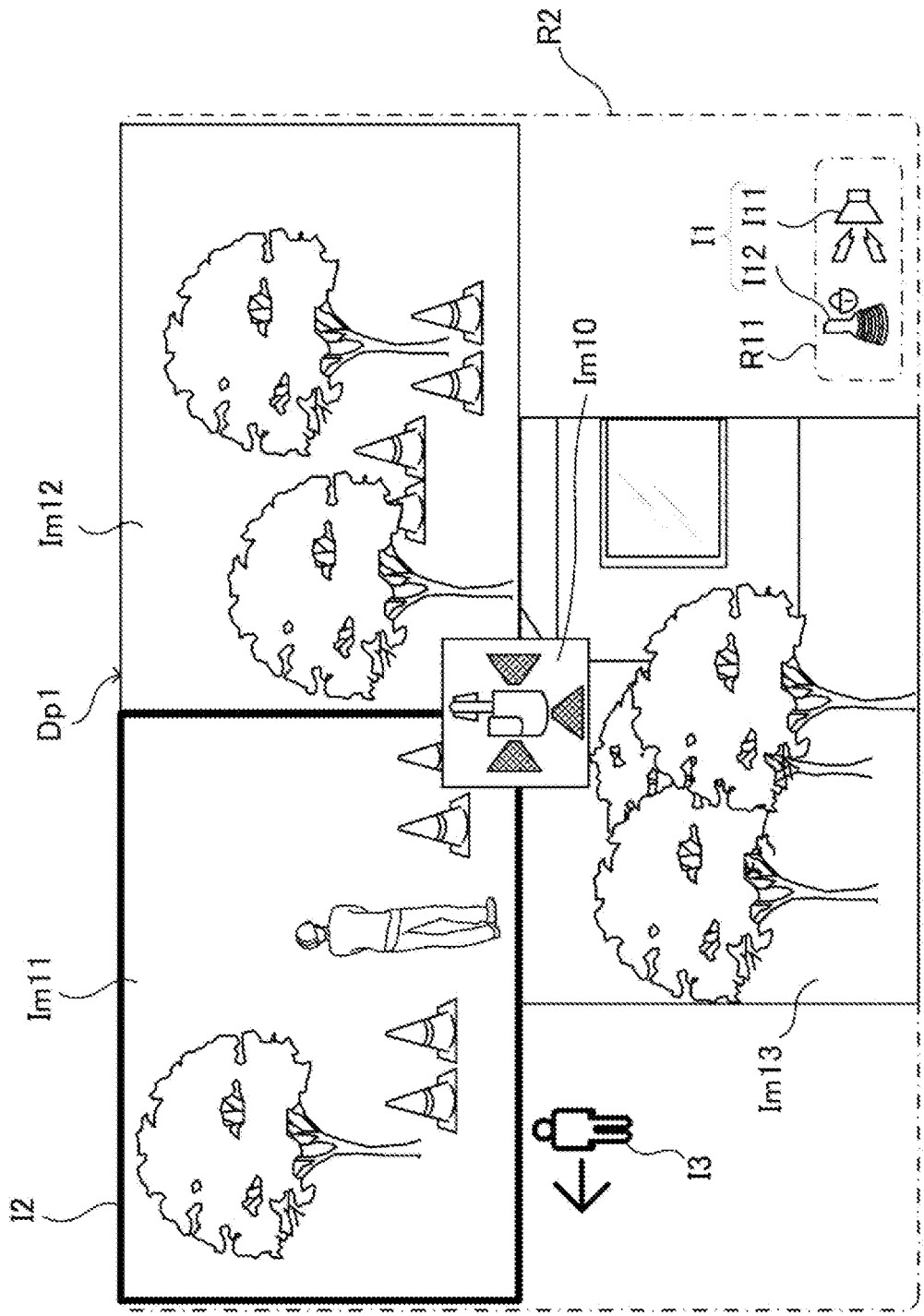
FIG. 7 is a diagram illustrating a display example of a second region in the display screen displayed by the work machine control system according to the first embodiment.

Here, as illustrated in FIG. 7, the display screen Dp1 includes detection result information I2 and detection result information I3 indicating results of the detection performed by the detector 15 in this embodiment. In FIG. 7, only the second region R2 of the display screen Dp1 is shown, and regions other than the second region R2 are omitted. The detection result information I2 is a graphic image of a band shape (a frame shape) displaying one of the captured images Im11, Im12, and Im13 that includes the detection target Ob1 in an emphasized manner. The detection result information I3 is a graphic image indicating a direction in which the detection target Ob1 exists as seen from the driving section 321. In the example in FIG. 7, it is assumed that the small area A11 located on the left side of the driving section 321 that is captured by the left camera 341 includes the detection target Ob1 (a "person" herein). Therefore, among the captured images Im11, Im12, and Im13, the captured image Im11 is displayed in an emphasized manner in the detection result information I2, and the detection result information I3 indicating that the detection target Ob1 is positioned on a left side of the driving section 321 is displayed beneath the captured image Im11.

The display mode of the detection result information I2 and the detection result information I3 is preferably changed according to a position of the detection target Ob1 in the monitoring area A1. For example, the display modes of the detection result information I2 and the detection result information I3, such as a display color, a size, or a display pattern (including blinking pattern), are changed according to a position of the detection target Ob1 in the monitoring area A1. For example, the closer the detection target Ob1 is to the machine body 30, the more prominent the display color of the display mode of the detection result information I2 and the detection result information I3. For example, as the detection target Ob1 moves closer to the machine body 30, the display color of the detection result information I2 and the detection result information I3 changes from yellow to red.

Thus, the display screen Dp1 displays not only the captured images Im11, Im12, and Im13 of the monitoring area A1 but also the detection results of the detection target Ob1 in the monitoring area A1 as the detection result information I2 and the detection result information I3. Therefore, the operator (the user U1) can easily recognize the presence or absence (presence/absence) of the detection target Ob1 in the monitoring area A1 by viewing the display screen Dp1.

In short, in the control method according to this embodiment, the display screen Dp1 includes the captured images Im11, Im12, and Im13 in the monitoring area A1. Therefore, the operator (the user U1) may recognize situations at the side and rear areas of the work machine 3 which are likely to be blind spots of the driving section 321 on the display screen Dp1 displayed on the display device 2. Therefore, when compared with the configuration in which only the detection result information I2 and the detection result information I3 are displayed, when the detection target Ob1 is included in the monitoring area A1, a state of the detection target Ob1 is easily recognized in detail on the display screen Dp1.

Furthermore, the captured images Im11, Im12, and Im13 include the plurality of small areas A11, A12, and A13, respectively, included in the monitoring area A1. Then, in the display screen Dp1, one of the images of the plurality of small areas A11, A12, and A13 that includes the detection target Ob1 is displayed in an emphasized manner. Specifically, one of the captured images Im11, Im12, and Im13 that includes the detection target Ob1 is displayed in an emphasized manner as the detection result information I2. This allows the operator (the user U1) to easily recognize, when the detection target Ob1 is included in the monitoring area A1, one of the plurality of small areas A11, A12, and A13 that includes the detection target Ob1.

Here, the detection result information I2 and the detection result information I3 are displayed not only when the function associated with the restraint process is enabled but also when the function associated with the restraint process is disabled. In other words, when the monitoring area A1 includes the detection target Ob1, the detection result information I2 and the detection result information I3 are displayed even when the restraint processor 12 is disabled and both the first restraint state information I11 and the second restraint state information I12 are grayed out so as to be displayed inactive ("Pattern 4" in FIG. 6). Thus, in the control method according to this embodiment, the display screen Dp1 includes the detection result information I2 and the detection result information I3 indicating a detection result of the detector 15, and the detection result information I2 and the detection result information I3 are displayed regardless of whether the function associated with the restraint process is enabled or disabled. Therefore, even when the function associated with the restraint process are disabled, the operator (the user U1) can recognize a detection result of the detector 15 on the display screen Dp1.

Figure 8:
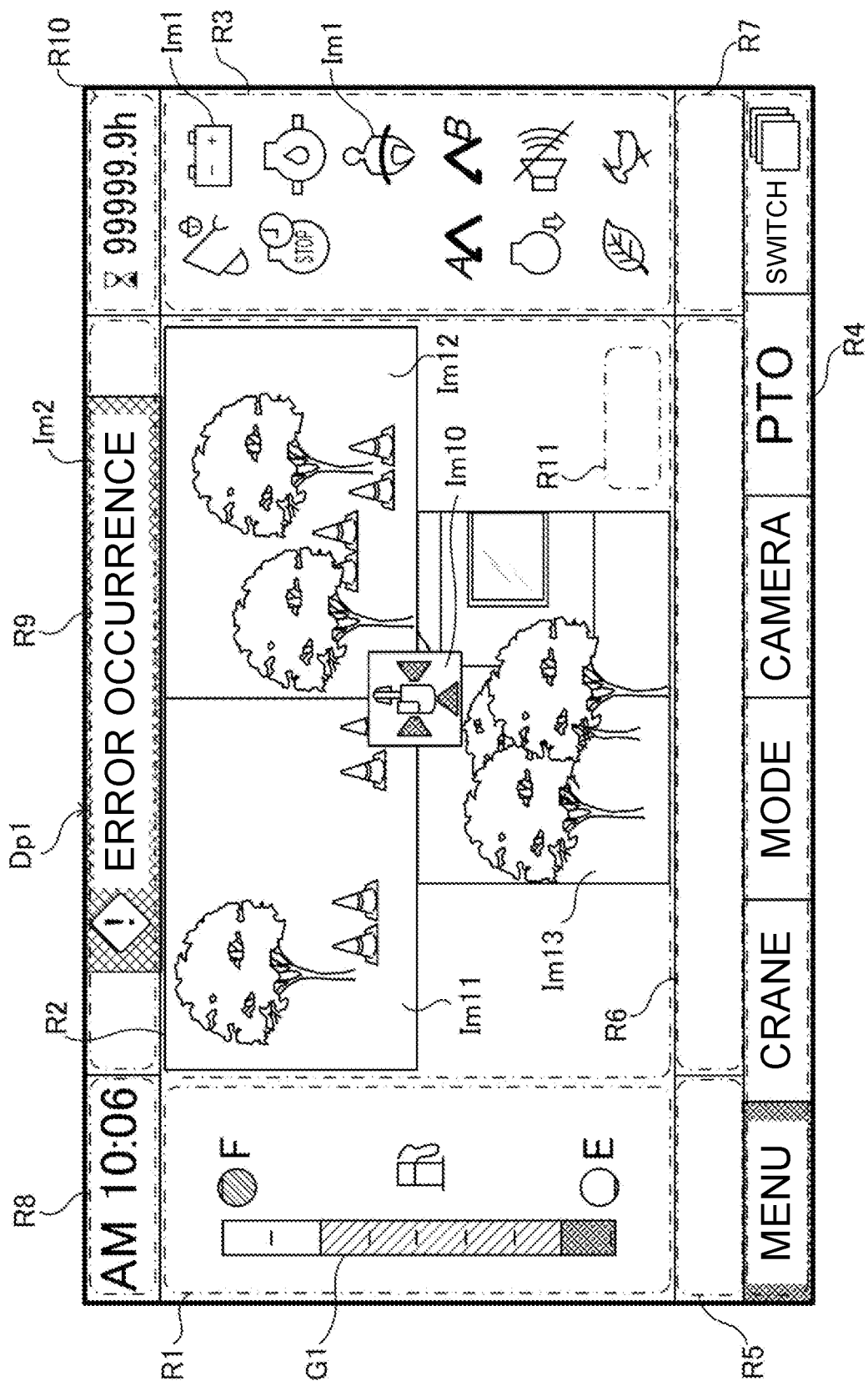
FIG. 8 is a diagram illustrating an example of the display screen displayed by the work machine control system according to the first embodiment.

Furthermore, in this embodiment, when an error associated with the detection of the detector 15 occurs, the display mode of the restraint state information I1 is set to an error mode. The "error mode" is a display mode of the restraint state information I1 when an error associated with the detection of the detector 15 occurs, and is distinguished from a case where an error has not occurred in the detection of the detector 15 by non-display of the restraint state information I1, a display color of the restraint state information I1, a size of the restraint state information I1, or a display pattern (including a blinking pattern) of the restraint state information I1, for example. Specifically, when the error determination section 16 determines that an error associated with the detection of the detector 15 has occurred, the restraint state information I1 of the 11th region R11 is not displayed as shown in FIG. 8 so that the display mode is changed to the error mode in which an error associated with the detection of the detector 15 is reported. Furthermore, in the example in FIG. 8, presentation information Im2, such as a message "Error", is displayed also in the ninth region R9 so as to indicate that an error is detected.

According to this configuration, the restraint state information I1 represents not only the enabled/disabled state of the function associated with the restraint process but also the presence or absence of an error associated with the detection of the detector 15. Therefore, the operator (user U1) can also recognize whether an error associated with the detection of the detector 15 has occurred on the display screen Dp1, and when an error associated with the detection of the detector 15 has occurred, required measures can be taken.

3.3 Overall Processing

Figure 9:
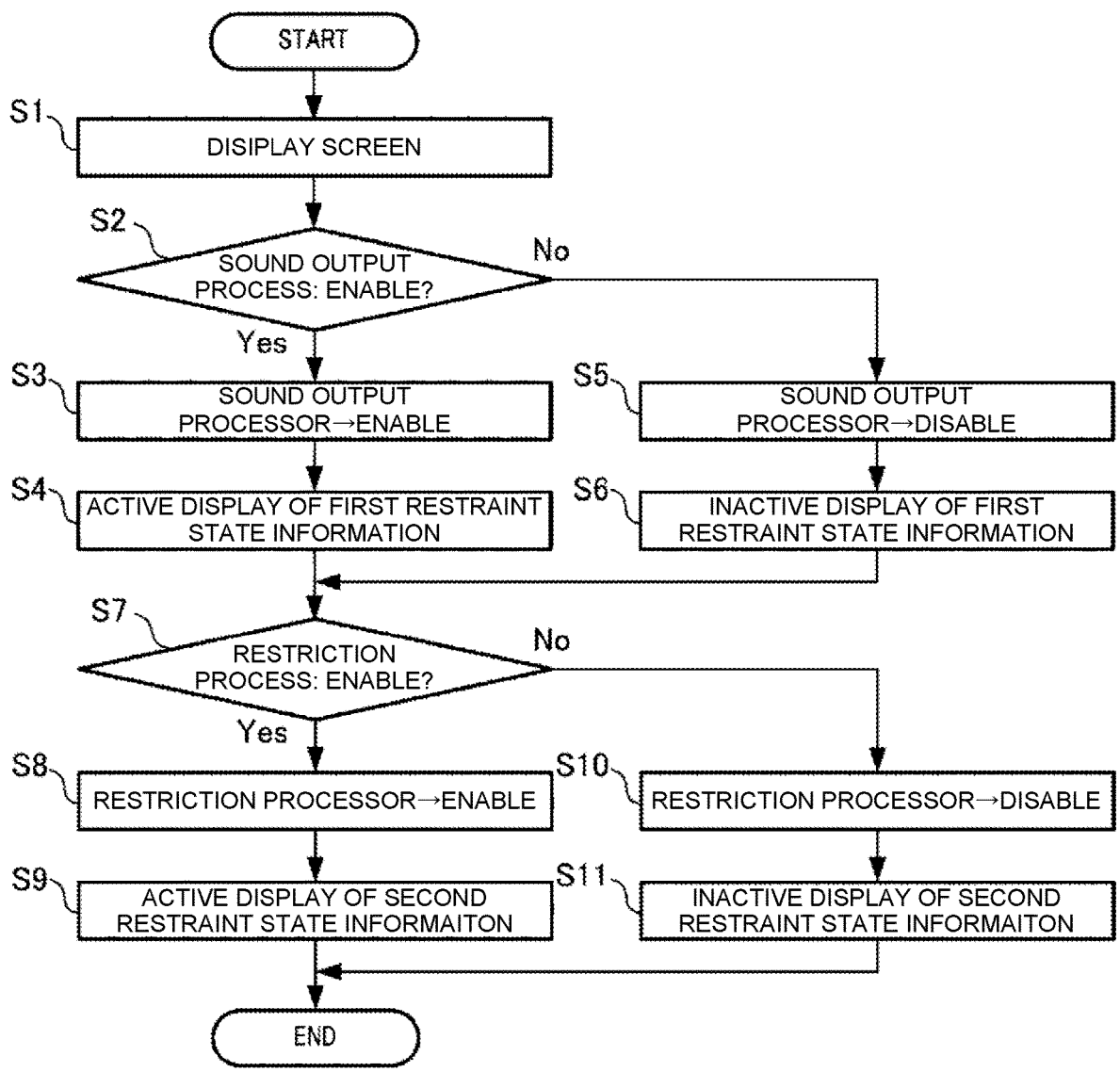
FIG. 9 is a flowchart of an example of an operation of the work machine control system according to the first embodiment.

Next, the entire processing flow associated with the control method will be described with reference to FIG. 9. FIG. 9 is a flowchart of an example of a process associated with the control method.

As illustrated in FIG. 9, the display processor 11 of the control system 1 displays the display screen Dp1 on the display device 2 (S1). Here, the control system 1 determines whether the function associated with the restraint process (the restraint processor 12) currently selected by the switch processor 13 is enabled or disabled.

Specifically, the control system 1 first determines whether the function associated with the sound output process in the restraint process is enabled (S2). When the function associated with the sound output process is set to be enabled (S2: Yes), the control system 1 enables the sound output processor 121 (S3). Then, the display processor 11 of the control system 1 displays the first restraint state information I11 included in the restraint state information I1 in the display screen Dp1 in an active state (S4). When the function associated with the sound output process is set to be disabled (S2: No), the control system 1 disables the sound output processor 121 (S5). Then, the display processor 11 of the control system 1 displays the first restraint state information I11 included in the restraint state information I1 in the display screen Dp1 in an inactive state (S6).

Furthermore, the control system 1 determines whether the function associated with the restriction process in the restraint process is enabled (S7). When the function associated with the restriction process is set to be enabled (S7: Yes), the control system 1 enables the restriction processor 122 (S8). Then, the display processor 11 of the control system 1 displays the second restraint state information I12 included in the restraint state information I1 in the display screen Dp1 in an active state (S9). On the other hand, when the function associated with the restriction process is set to be disabled (S7: No), the control system 1 disables the restriction processor 122 (S10). Then, the display processor 11 of the control system 1 displays the second restraint state information I12 included in the restraint state information I1 in the display screen Dp1 in an inactive state (S11).

The control system 1 repeatedly executes the process from steps S1 to step S11. As a result, the display screen Dp1 shows the restraint state information I1 indicating the state (an enabled/disabled state) of the functions associated with the restraint process. However, the flowchart illustrated in FIG. 9 is merely an example, and a process may be added or omitted as appropriate, or the order of processing may be changed as appropriate.

4. Modifications

Hereinafter, modifications of the first embodiment will be described. The modifications described below can be applied in combination as appropriate.

The control system 1 according to the present disclosure includes a computer system. The computer system includes, as main components, at least one processor and at least one memory as hardware. When the processor executes a program recorded in the memory of the computer system, functions as the control system 1 in the present disclosure are realized. The program may be recorded in the memory of the computer system in advance, may be provided through an electric communication line, or may be recorded on a non-transitory recording medium, such as a memory card, an optical disk, a hard disk drive, or the like, that is readable by the computer system. Furthermore, some of or all the functional sections included in the control system 1 may be configured by an electronic circuit.

A configuration in which at least one of the functions of the control system 1 is integrated in one case is not always necessary and the components of the control system 1 may be provided in a plurality of cases in a distributed manner. Conversely, functions that are distributed among the plurality of devices (such as the control system 1 and the display device 2) in the first embodiment may be consolidated in a single case. Furthermore, at least a number of the functions of the control system 1 may be realized by a cloud (cloud computing) or the like.

The power source of the work machine 3 is not limited to a diesel engine, but may be, for example, an engine other than a diesel engine, a motor (an electric motor), or a hybrid power source that includes an engine and a motor (an electric motor).

The display device 2 is not limited to a dedicated device, but may be a general-purpose terminal, such as a laptop computer, a tablet terminal, or a smartphone. Furthermore, the display section 23 is not limited to a mode in which a display screen is directly displayed, such as a liquid crystal display or an organic EL display, but may also have a configuration that displays a display screen by projection, such as a projector.

Furthermore, as a mode for inputting information on the operating unit 22, a mode other than a push button switch, a touch panel, and an operation dial may also be employed. For example, the operating unit 22 may employ a pointing device, such as a keyboard or a mouse, a voice input, a gesture input, or an input of an operation signal from another terminal.

Furthermore, the error mode, which is the display mode of the restraint state information I1 displayed when an error associated with detection of the detector 15 occurs is not limited to "non-display" as shown in FIG. 8. For example, when an error associated with the detection of the detector 15 has occurred, a display color of the restraint state information I1 may be changed to red or other colors so that the restraint state information I1 is displayed in an error mode. In this case, the restraint state information I1 is displayed in an error mode regardless of whether the function associated with the restraint process is enabled or disabled.

The restriction process performed by the restriction processor 122 at least restricts an operation of the work machine 3, and is not limited to a process of prohibiting (disabling) the operation of the work machine 3 (such as the swivel operation). The restriction process may, for example, reduce a speed of an operation of the work machine 3 (such as the swivel operation), narrow an operation range (such as a swiveling angle) of the work machine 3, or restrict an allowable area of the operation of the work machine 3.

As a specific configuration for reducing the speed of an operation of the work machine 3, for example, a (solenoid) proportional control valve may be used, instead of an open/close valve capable of performing switching between an open state and a close state of a flow path, as the control valve 46 inserted into the flow path of the pilot oil between the remote control valve 45 and the pilot pump 42, for example. The control valve 46 constituted by a proportional control valve is connected to the control system 1 and operates in response to an electric signal (supply current) supplied from the control system 1. As an example, the control valve 46 is an inverse proportional valve which reduces an output of the corresponding hydraulic actuator as the supply current increases. Accordingly, the restriction processor 122 increases the current to be supplied to the control valve 46 so as to reduce an output of the corresponding hydraulic actuator and reduce a speed of the operation of the work machine 3. Alternatively, a variable capacity pump may be employed, for example, as the pilot pump 42. In this case, the restriction processor 122 controls the variable capacity pump to reduce a flow rate of the pilot oil so as to reduce an output of a corresponding hydraulic actuator and reduce the speed of operation of the work machine 3.

The sensors for detecting the detection target Ob1 in the monitoring area A1 around the work machine 3 are not limited to the left camera 341, the right camera 342 and the rear camera 343, but may be one, two, or four or more cameras (image sensors). Furthermore, for example, a camera capable of capturing images in all directions seen from the work machine 3, such as a entire celestial sphere camera (360-degrees camera), may be used to detect the detection target Ob1 in the monitoring area A1. The sensors for detecting the detection target Ob1 in the monitoring area A1 may include, in addition to or instead of the cameras, for example, sensors, such as a motion sensor, a sonar sensor, radar or LiDAR (Light Detection and Ranging). Here, the sensor detecting the detection target Ob1 in the monitoring area A1 may be a three-dimensional sensor that measures a distance to the detection target Ob1 by a TOF (Time Of Flight) method for measuring a distance to a ranging point based on a round trip time until light or sound reaches the ranging point and returns.

In addition to or instead of a "person", the detection target Ob1 may include a moving body, such as a vehicle (including other work machines), a structure, such as a wall and a pillar, a plant, an animal, a step, a groove, or other obstacles.

Furthermore, the restraint process may not include a plurality of specific processes (such as the sound output process and the restriction process) to restrain an operation of the work machine 3. Even when the restraint process includes a plurality of specific processes, the specific processes may not be individually switched from an enabled state to a disabled state, and the plurality of specific processes may be switched from an enabled state to a disabled state in a batched manner. The restraint state information I1 may not indicate whether each of the specific processes is in an enabled state or a disabled state. Furthermore, the restraint state information I1 may not indicate that the function associated with the restraint process is disabled when the function associated with the restraint process is disabled, and the restraint state information I1 may not be displayed, for example, when the function associated with the restraint process is disabled.

Furthermore, the display screen Dp1 may not include the captured images Im11, Im12, and Im13 of the monitoring area A1. Furthermore, the captured images Im11, Im12, and Im13 may not include the images of the plurality of small areas A11, A12, and A13 included in the monitoring area A1, and may include only an image of a single small area. The restraint process may not include at least one of the sound output process of outputting an alarm sound and the restriction process of restricting the operation of the work machine 3. Furthermore, the restriction process may not include a process of restricting the swivel operation of the swivel section 32, and may restrict a traveling operation of the traveling section 31. Moreover, displaying the detection result information I2 and the detection result information I3 regardless of whether the function associated with the restraint process is enabled or disabled is not always necessary, and may be displayed only when the function associated with the restraint process is enabled. Furthermore, when an error associated with the detection of the detector 15 occurs, the display mode of the restraint state information I1 may not be set to an error mode.

Figure 10:
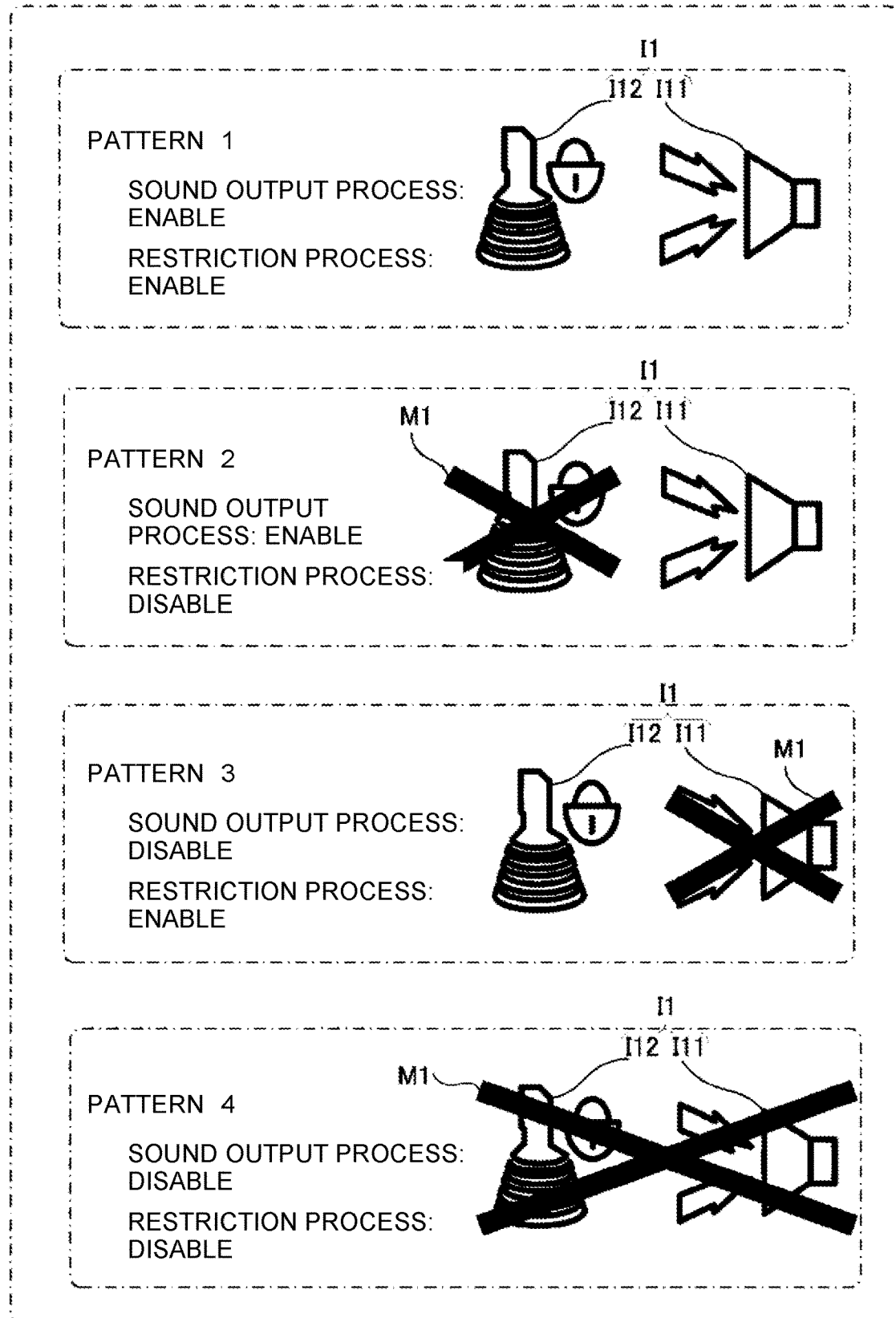
FIG. 10 is a diagram illustrating an example of a display mode of restraint state information in a display screen displayed by a work machine control system according to a modification of the first embodiment.

The inactive display of the restraint state information I1 which indicates that the function associated with the restraint process is disabled is not limited to a grayed-out display mode. For example, as shown in FIG. 10, when the function associated with the restraint process is disabled, the restraint state information I1 may be displayed inactive by superimposing a mark M1, such as a cross or other mark, indicating a disabled state. Specifically, when the sound output processor 121 is enabled and the restriction processor 122 is disabled in the restraint processor 12, for example, as in "Pattern 2" illustrated in FIG. 10, the first restraint state information I11 is displayed active and the second restraint state information I12 is displayed inactive by superimposing the mark M1. In "Pattern 4" where both the sound output process and the restriction process are disabled, as shown in FIG. 10, one mark M1 is superimposed on the first restraint state information I11 and the second restraint state information I12 or a mark M1 may be superimposed on each of the first restraint state information I11 and the second restraint state information I12. Furthermore, the mark M1 indicating the disabled state is not limited to a cross mark, but can be any graphic, such as a diagonal line, a cancellation line, or a rectangle, or text such as "disabled". In addition, the inactive display of the restraint state information I1 is not limited to the mark M1 superimposed on the restraint state information I1, the restraint state information I1 may be displayed inactive by a display mode for displaying the mark M1 associated with the restraint state information I1 in the vicinity of the restraint state information I1.

Second Embodiment

Figure 11:
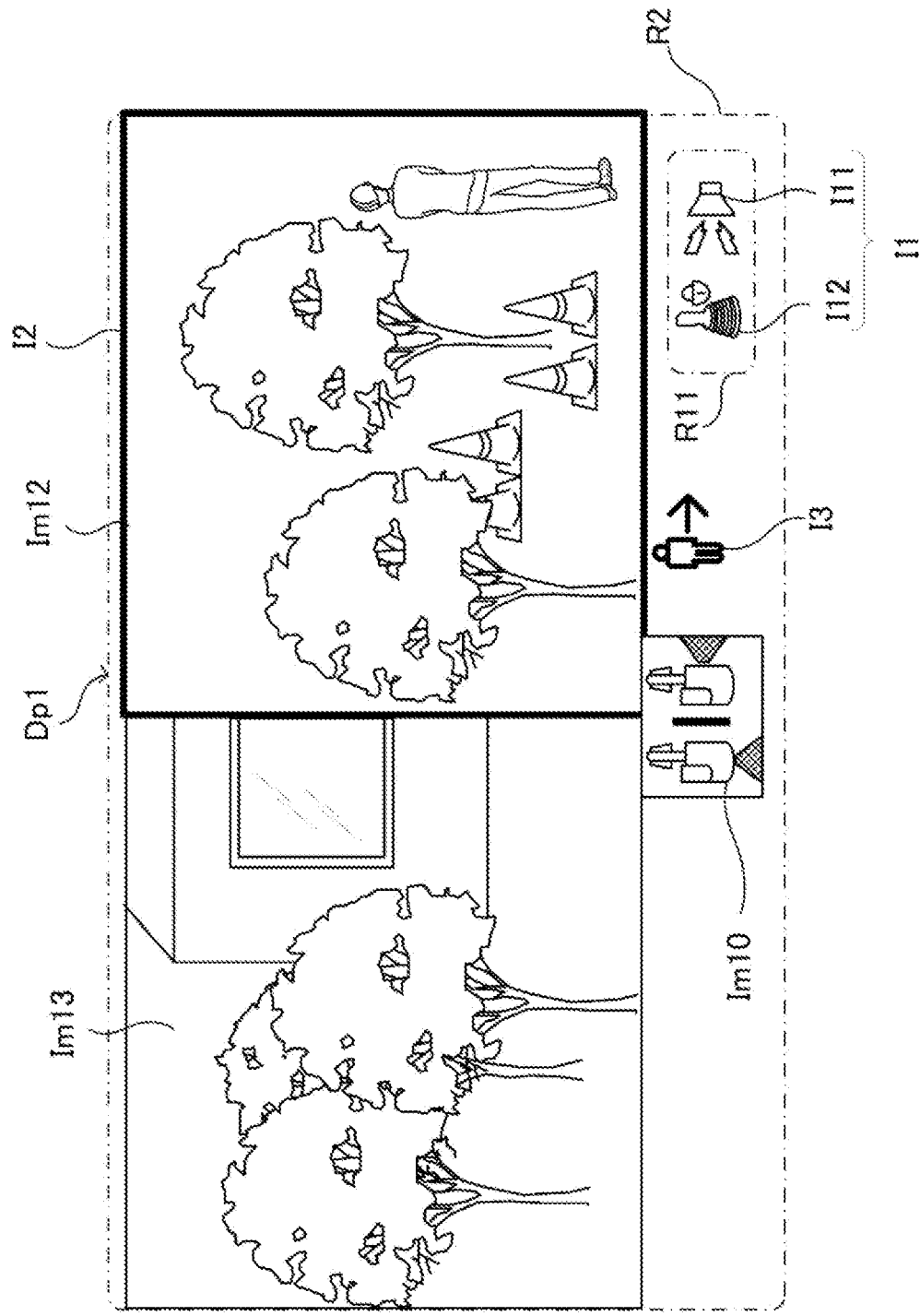
FIG. 11 is a diagram illustrating a display example of a second region in a display screen displayed by a work machine control system according to a second embodiment.
Figure 12:
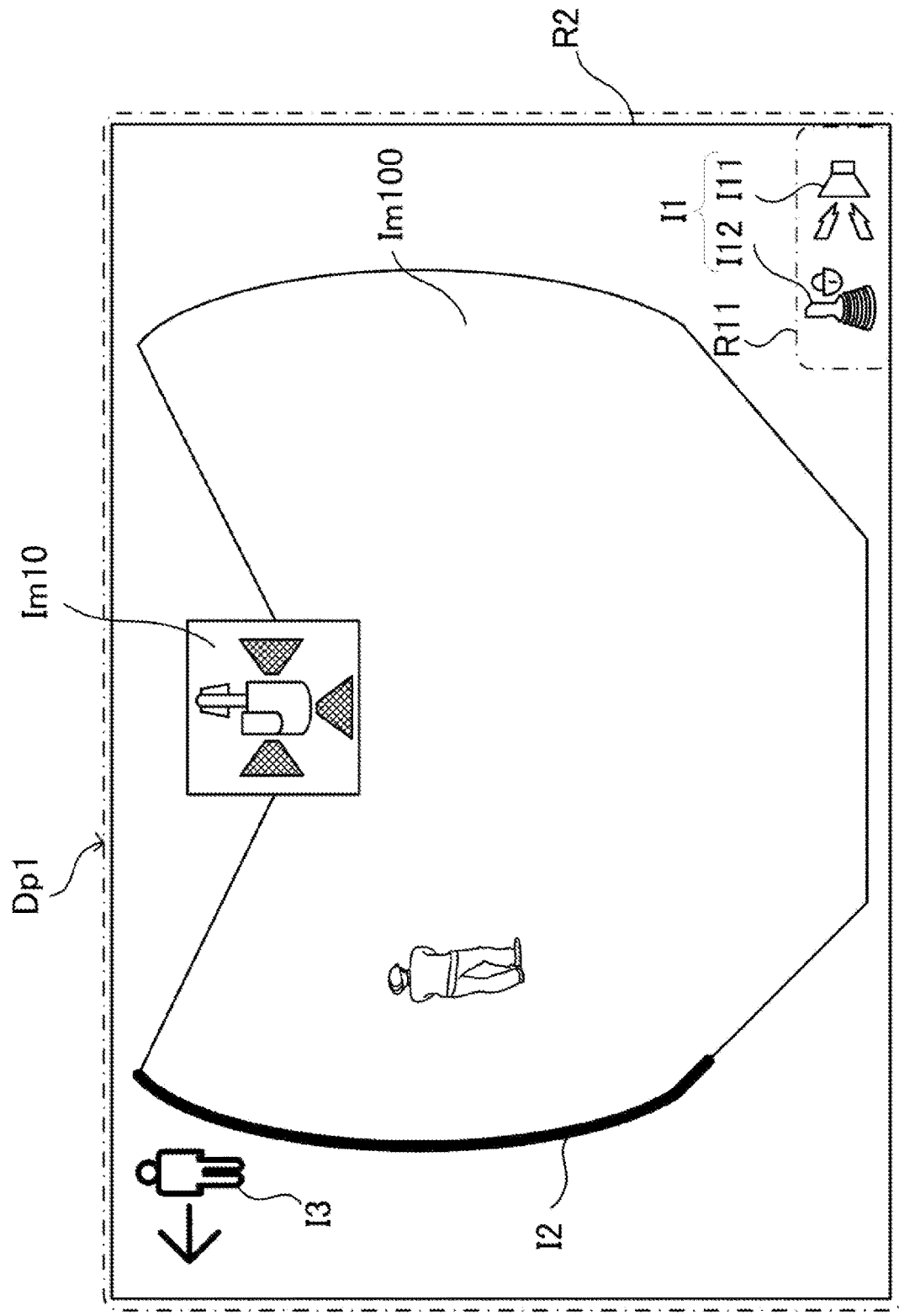
FIG. 12 is a diagram illustrating a display example of the second region in the display screen displayed by the work machine control system according to the second embodiment.

As illustrated in FIGS. 11 and 12, a work machine 3 of this embodiment is different from the work machine 3 of first embodiment in display content of a second region R2 of a display screen Dp1. Hereinafter, the same configurations as those in the first embodiment will be denoted by the same signs, and explanation will be omitted as appropriate. In FIGS. 11 and 12, only the second region R2 of the display screen Dp1 is shown, and regions other than the second region R2 are omitted.

In the example in FIG. 11, the second region R2 displays two screens, that is, among images Im11, Im12, and Im13 of a monitoring area A1 (refer to FIG. 7), the image Im12 captured by the right camera 342 and the image Im13 captured by the rear camera 343. In this example, the captured images Im12 and Im13 are arranged side by side in the second region R2, and an icon Im10 is displayed below the captured images Im12 and Im13. The icon Im10 schematically illustrates the positional relationship among imaging ranges (small areas A12 and A13) of a right camera 342 and a rear camera 343 as seen from the machine body 30.

In the example of FIG. 12, an overhead image Im100 of the monitoring area A1 is displayed in the second region R2. The overhead image Im100 is a type of captured image generated by performing coordinate transform on the captured images Im11, Im12, and Im13 of a left camera 341, a right camera 342, and a rear camera 343, respectively, and combining the captured images Im11, Im12, and Im13. Even in this overhead image Im100, detection result information I2 is a graphic image of a band shape (a frame shape) displaying a small area including a detection target Ob1 in an emphasized manner. The overhead image Im100 may be obtained by compositing captured images into an animation.

The two-screen display as illustrated in this embodiment (refer to FIG. 11) and the overhead image Im100 (refer to FIG. 12) may be arbitrarily switchable by operating an operating unit 22 of a display device 2. In this case, it is preferable that a user U1 can select an arbitrary display format including the three-screen display described in the first embodiment (refer to FIG. 7).

The configuration of the second embodiment can be employed in combination with the various configurations (including the modifications) described in the first embodiment where appropriate.

REFERENCE SIGNS LIST

1: work machine control system
2: display device
3: work machine
11: display processor
12: restraint processor
13: switch processor
15: detector
30: machine body
31 traveling section
32: swivel section
A1: monitoring area
A11, A12, A13: small area
Dp1: display screen
I1: restraint state information
Im11, Im12, Im13: captured image
Im100: overhead image (captured image)
Ob1: detection target

The invention claimed is:

1. A method for controlling a work machine, comprising:
   executing a restraint process of restraining an operation of the work machine based on a detection result of a detector detecting a detection target in a monitoring area around the work machine;
   performing switching between an enabled state and a disabled state of a function associated with the restraint process; and
   displaying a display screen including restraint state information indicating whether the function associated with the restraint process is enabled or disabled, on a display device, wherein when the function associated with the restraint process is disabled, the fact that the function associated with the restraint process is disabled is displayed as the restraint state information.

2. The method for controlling the work machine according to claim 1, wherein the restraint process includes a plurality of specific processes for restraining the operation of the work machine, and the switching between an enabled state and a disabled state is performed for each specific process.

3. The method for controlling the work machine according to claim 2, wherein the restraint state information indicates whether each of the specific processes is enabled or disabled.

4. The method for controlling the work machine according to claim 1, wherein the display screen includes a captured image of the monitoring area.

5. The method of controlling the work machine according to claim 4, wherein
   the captured image includes images of a plurality of small areas included in the monitoring area, and
   on the display screen, one of the images of the small areas that includes the detection target is displayed in an emphasized manner.

6. The method for controlling the work machine according to claim 1, wherein the restraint process includes a sound output process of outputting an alarm sound.

7. The method for controlling the work machine according to claim 1, wherein the restraint process includes a restriction process of restricting an operation of the work machine.

8. The method for controlling the work machine according to claim 7, wherein
   the work machine includes a traveling section and a swivel section that swivels relative to the traveling section, and
   the restriction process restricts at least the swivel operation of the swivel section.

9. The method for controlling the work machine according to claim 1, wherein
   the display screen includes detection result information indicating a detection result of the detector, and
   the detection result information is displayed irrespective of whether the function associated with the restraint process is enabled or disabled.

10. The method for controlling the work machine according to claim 1, wherein, when an error associated with a detection of the detector occurs, the restraint state information is displayed in an error mode.

11. A work machine control program that causes at least one processor to execute the method for controlling the work machine according to claim 1.

12. A work machine control system, comprising:
    a restraint processor that executes a restraint process of restraining an operation of the work machine based on a detection result of a detector detecting a detection target in a monitoring area around the work machine;

a switch processor that performs switching between an enabled state and a disabled state of the restraint processor; and a display processor that displays a display screen including restraint state information indicating whether the restraint processor is enabled or disabled, on a display device, wherein when the function associated with the restraint process is disabled, the fact that the function associated with the restraint process is disabled is displayed as the restraint state information.

13. A work machine, comprising:

the work machine control system according to claim 12; and a machine body on which the display device is mounted.

* * * * *